US012499581B2

(12) United States Patent
Karabutov et al.

(10) Patent No.: US 12,499,581 B2
(45) Date of Patent: Dec. 16, 2025

(54) SCALABLE CODING OF VIDEO AND ASSOCIATED FEATURES

(71) Applicant: HUAWEI TECHNOLOGIES CO., LTD., Guangdong (CN)

(72) Inventors: Alexander Alexandrovich Karabutov, Moscow (RU); Hyomin Choi, Burnaby (CA); Ivan Bajic, Burnaby (CA); Robert A. Cohen, Burnaby (CA); Saeed Ranjbar Alvar, Burnaby (CA); Sergey Yurievich Ikonin, Moscow (RU); Elena Alexandrovna Alshina, Munich (DE); Yin Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 362 days.

(21) Appl. No.: 17/981,163

(22) Filed: Nov. 4, 2022

(65) Prior Publication Data

US 2023/0065862 A1 Mar. 2, 2023

Related U.S. Application Data

(63) Continuation of application No. PCT/RU2021/000013, filed on Jan. 13, 2021.

(51) Int. Cl.
*G06V 10/00* (2022.01)
*G06T 9/00* (2006.01)
(Continued)

(52) U.S. Cl.
CPC ............... *G06T 9/00* (2013.01); *G06V 10/44* (2022.01); *G06V 10/761* (2022.01); *G06V 10/82* (2022.01); *H04N 19/172* (2014.11)

(58) Field of Classification Search
CPC ...... G06V 10/40; G06V 10/761; G06V 10/82; G06V 10/44; G06V 20/46; H04N 19/30; H04N 19/172; G06T 9/00
See application file for complete search history.

(56) References Cited

U.S. PATENT DOCUMENTS 7,933,456 B2 * 4/2011 Han ..................... H04N 19/12
382/233
8,126,054 B2 * 2/2012 Hsiang .................. H04N 19/59
375/240.18
(Continued)

FOREIGN PATENT DOCUMENTS

WO          2020055279 A1     3/2020
WO          2020188273 A1     9/2020

OTHER PUBLICATIONS

Nokia, [VCM] Uses Cases for Video Coding for Machines, International Organisation for Standardisation Organisation Internationale De Normalisation ISO/IEC JTC1/SC29/WG 11 Coding of Moving Pictures and Audio, ISO/IEC JTC1/SC29/WG11 MPEG2019/m51176 Oct. 2019, Geneva, Switzerland, 4 pages.
(Continued)

*Primary Examiner* — Amir Alavi

(57) ABSTRACT

The present disclosure relates to scalable encoding and decoding of pictures. In particular, a picture is processed by one or more network layers of a trained module to obtain base layer features. Then, enhancement layer features are obtained, e.g. by a trained network processing in sample domain. The base layer features are for use in computer vision processing. The base layer features together with enhancement layer features are for use in picture reconstruction, e.g. for human vision. The base layer features and the enhancement layer features are coded in a respective base layer bitstream and an enhancement layer bitstream. Accord-
(Continued)

ingly, a scalable coding is provided which supports computer vision processing and/or picture reconstruction.

21 Claims, 21 Drawing Sheets

(51) Int. Cl.
    *G06V 10/44* (2022.01)
    *G06V 10/74* (2022.01)
    *G06V 10/82* (2022.01)
    *H04N 19/172* (2014.01)

(56) References Cited

U.S. PATENT DOCUMENTS

| | | | | |
|---|---|---|---|---|
| 8,160,158 B2* | 4/2012 | Choi | ............... | H04N 19/184 |
| | | | | 375/240.26 |
| 8,432,968 B2* | 4/2013 | Ye | ............... | H04N 19/51 |
| | | | | 375/240.12 |
| 9,137,539 B2* | 9/2015 | Kashiwagi | ............... | H04N 19/597 |
| 9,219,913 B2* | 12/2015 | Tu | ............... | H04N 19/105 |
| 9,571,840 B2* | 2/2017 | Regunathan | ............... | H04N 19/196 |
| 10,284,864 B2* | 5/2019 | Kim | ............... | H04N 19/129 |
| 10,455,242 B2* | 10/2019 | Wang | ............... | H04N 19/30 |
| 10,542,286 B2* | 1/2020 | Yu | ............... | H04N 19/59 |
| 11,677,967 B2* | 6/2023 | Minoo | ............... | H04N 19/176 |
| | | | | 375/240.02 |
| 2018/0174047 A1 | 6/2018 | Bourdev et al. | | |
| 2021/0042964 A1* | 2/2021 | Yeung | ............... | G06N 3/045 |

OTHER PUBLICATIONS

Karen Simonyan et al, Very Deep Convolutional Networks for Large-Scale Image Recognition, arXiv:1409.1556v6 [cs.CV] Apr. 10, 2015, 14 pages.

Zhejiang University, Potential Chances of Standarization on Video Coding for Machines (VCM), International Organisation for Standardisation Organisation Intern a Tio Nale De Normalisation ISO/IEC JTC1/SC29/WG11 Coding of Moving Pictures and Audio, ISO/IEC JTC1/SC29/WG11 MPEG2020/M52123 Jan. 2020, Brussels, BE, 12 pages.

Olaf Ronneberger et al, U-Net: Convolutional Networks for Biomedical Image Segmentation, arXiv:1505.04597v1 [cs.CV] May 18, 2015, 8 pages.

Joseph Redmon et al, You Only Look Once:Unified, Real-Time Object Detection, arXiv:1506.02640v5 [cs.CV] May 9, 2016, 10 pages.

Johannes Ball et al, Density Modeling of Images Using a Generalized Normalization Transformation, arXiv:1511.06281v4 [cs.LG] Feb. 29, 2016, 14 pages.

Wei Liu et al, SSD: Single Shot MultiBox Detector, arXiv:1512.02325v5 [cs.CV] Dec. 29, 2016, 17 pages.

Kaiming He et al, Deep Residual Learning for Image Recognition, arXiv:1512.03385v1 [cs.CV] Dec. 10, 2015, 12 pages.

Saeed Ranjbar Alvar et al, Multi-Task Learning With Compressible Features for Collaborative Intelligence, arXiv:1902.05179v2 [cs.MM] May 15, 2019, 5 pages.

Yueyu Hu et al, Towards Coding for Human and Machine Vision: a Scalable Image Coding Approach, arXiv:2001.02915v2 [cs.CV] Jan. 10, 2020, 6 pages.

Xiang Zhang et al, A Joint Compression Scheme of Video Feature Descriptors and Visual Content, IEEE Transactions on Image Processing, vol. 26, No. 2, Feb. 2017, 15 pages.

Ling-Yu Duan et al, Compact Descriptors for Video Analysis: The Emerging MPEG Standard, Visual Descriptor; Video Analytics; Standard, 2018 IEEE, 11 pages.

Hyomin Choi et al, Deep Feature Compression for Collaborative Object Detection, arXiv:1802.03931v1 [cs.CV] Feb. 12, 2018, 6 pages.

MPEG Requirements, Draft Call for Evidence for Video Coding for Machines, International Organization for Standardization Organisation Internationale De Normalisation ISO/IEC JTC1/SC29/WG11CODING of Moving Pictures and Audio ISO/IEC JTC1/SC29/WG11 MPEG2018/w19508, Jun.-Jul. 2020, Online, 8 pages.

\* cited by examiner

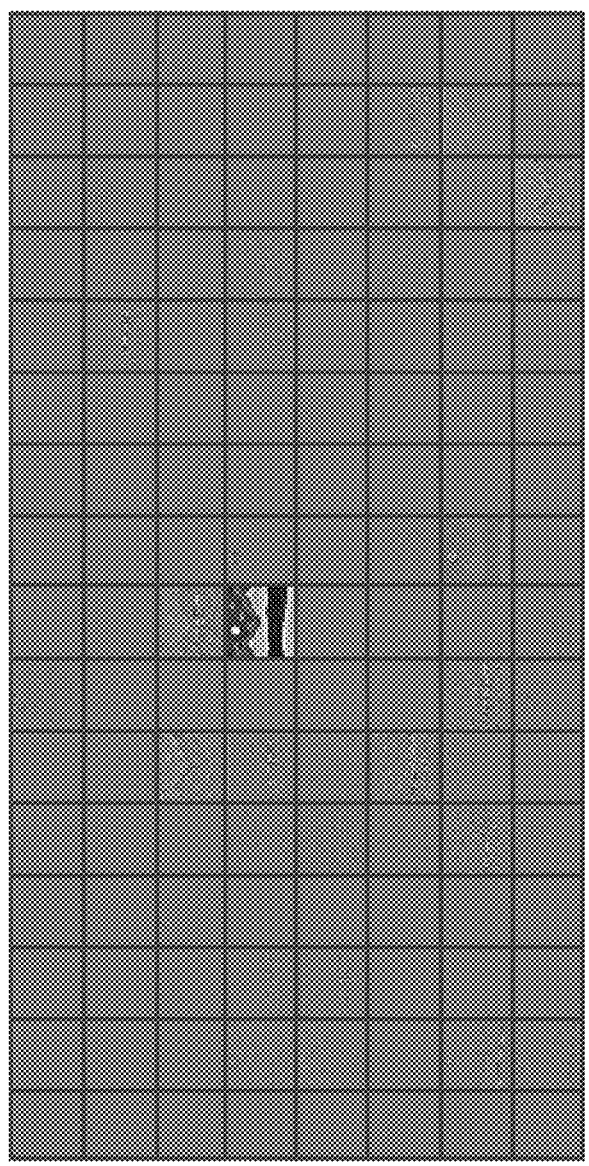
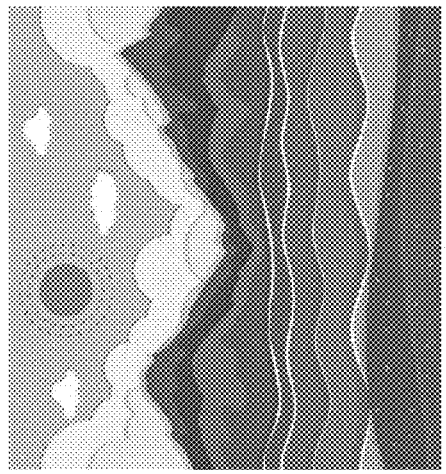
Fig. 9

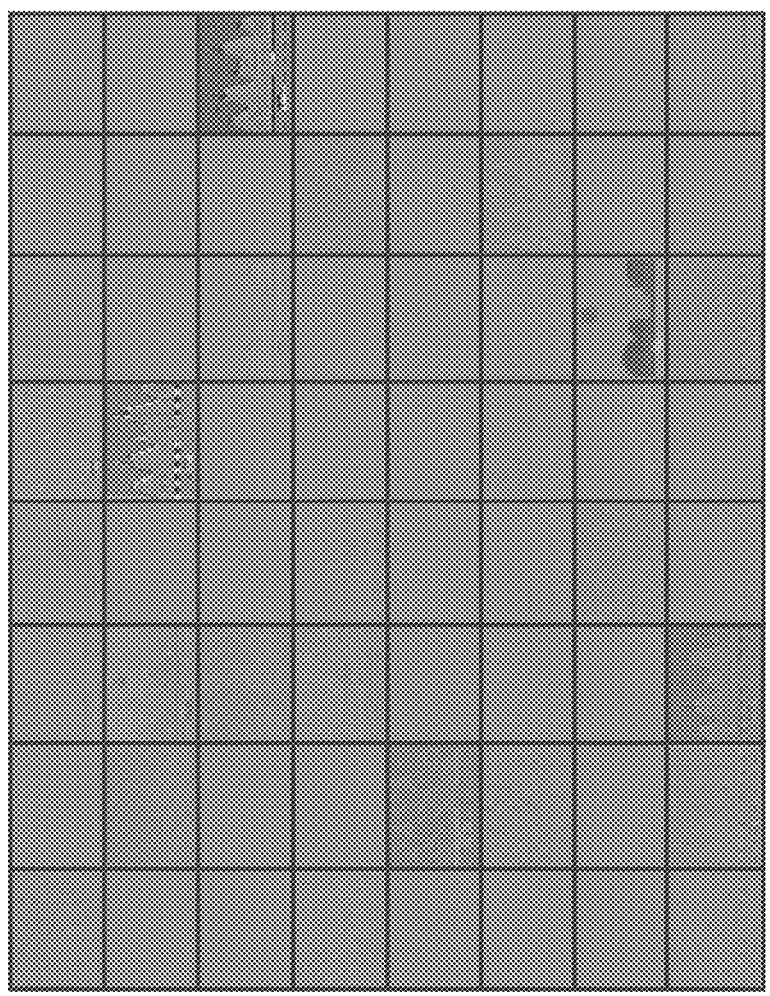
Feature Data 222
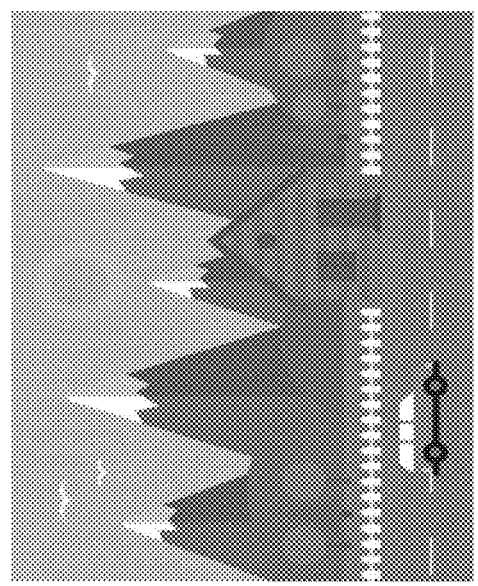
Input Picture 202
Fig. 10

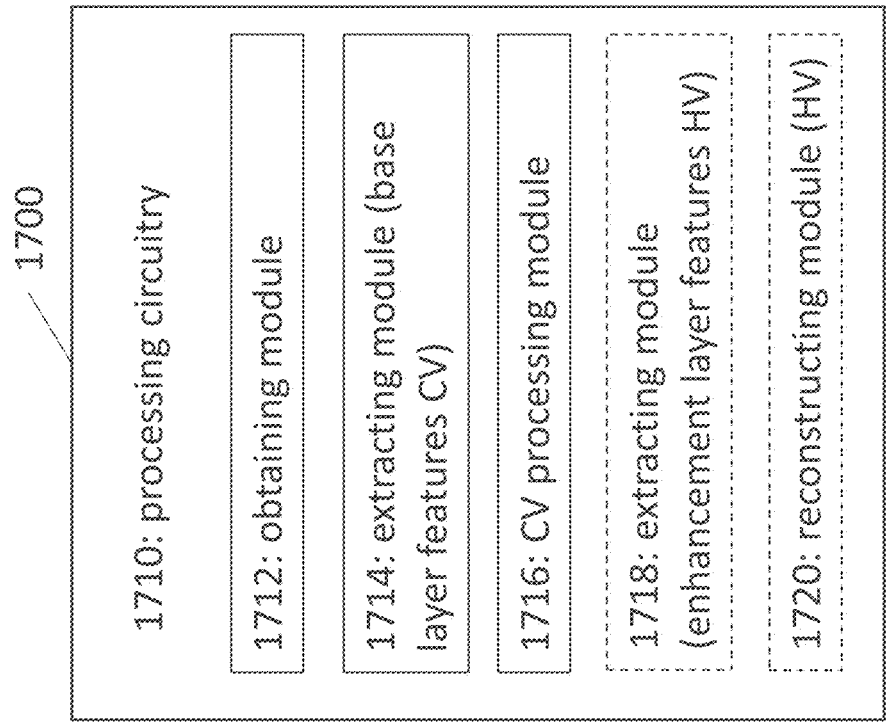

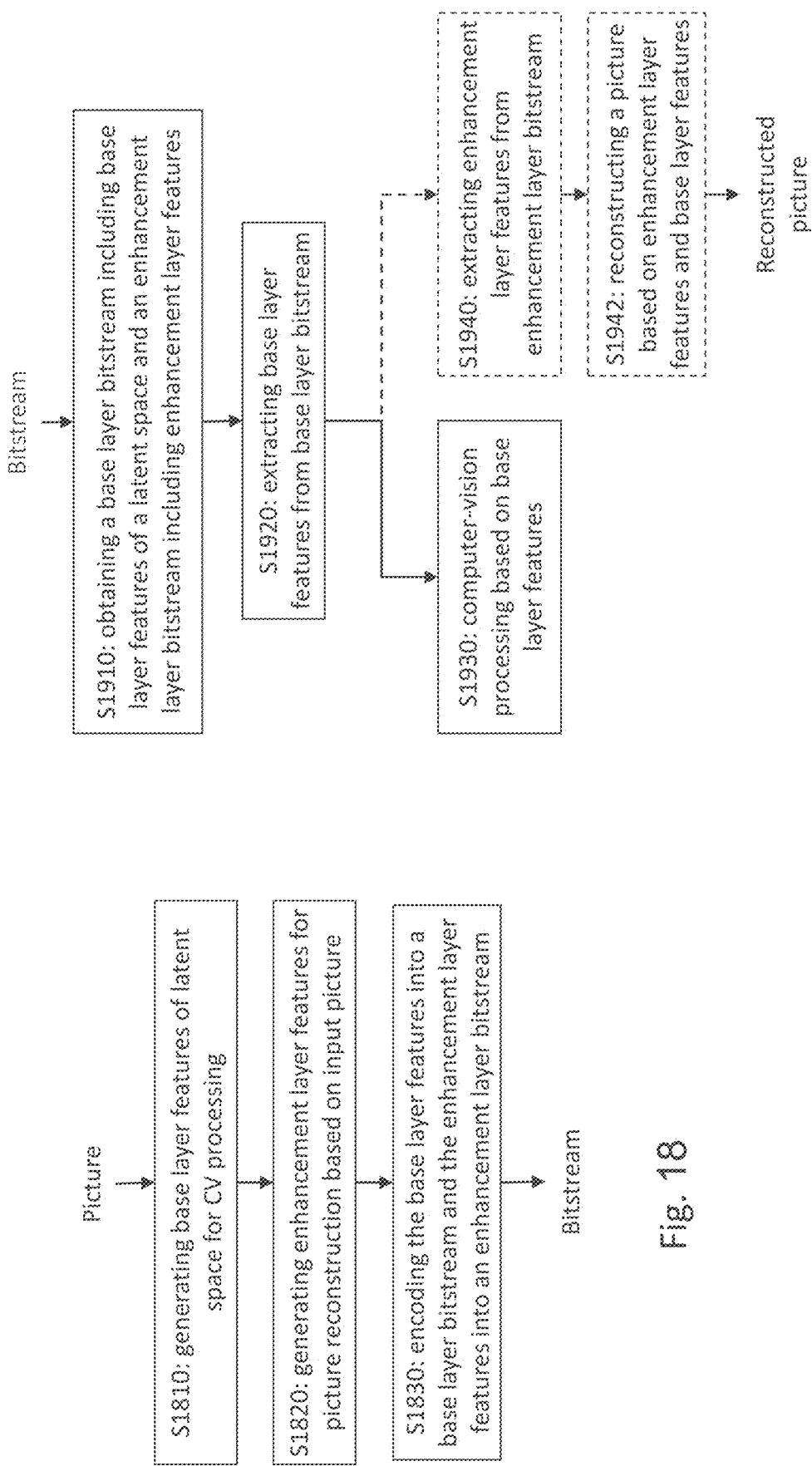

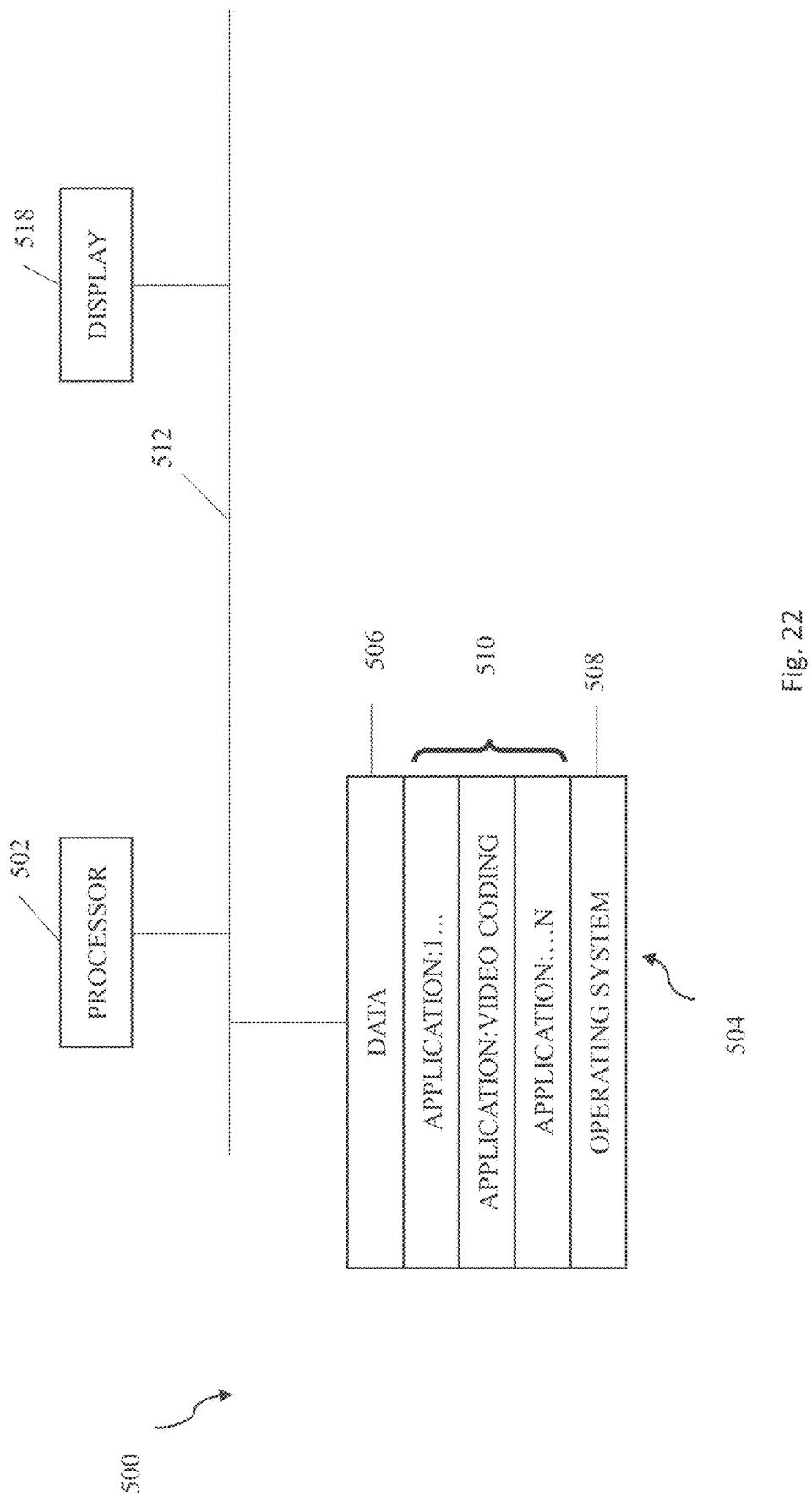

SCALABLE CODING OF VIDEO AND ASSOCIATED FEATURES

CROSS-REFERENCE TO RELATED APPLICATIONS

This application is a continuation of International Application No. PCT/RU2021/000013, filed on Jan. 13, 2021, the disclosure of which is hereby incorporated by reference in its entirety.

TECHNICAL FIELD

The present disclosure relates to scalable encoding and decoding of video images and image features of video images.

BACKGROUND

Video coding (video encoding and decoding) is used in a wide range of digital video applications, for example broadcast digital TV, video transmission over the Internet and mobile networks, real-time conversational applications such as video chat, video conferencing, DVD and Blu-ray discs, video content acquisition and editing systems, mobile device video recording and video security cameras.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266, Versatile Video Coding (VVC) and extensions, such as scalability and/or three-dimensional (3D) extensions, of these standards.

The encoding and decoding, i.e. the compression and decompressions of video images is also relevant for applications, for example, in video surveillance, where still and/or moving target objects need to be detected and identified. In present video surveillance solutions, videos are compressed at the terminal side (user or client), for example, at the camera or the like, and transmitted to servers, which may be part of a cloud. At the cloud side, the compressed video are then reconstructed and analyzed further. The encoding and decoding of the video may be performed by standard video encoders and decoders, compatible with H.264/AVC, HEVC (H.265), WC (H.266) or other video coding technologies, for example.

On one hand, computer vision (CV) algorithms, for example, for object detection or face recognition, are used to extract useful information from the videos, i.e. the video images. The typical detection and recognition CV algorithms are fundamentally based on features extracted from the videos, or more accurately speaking, from the individual frames of the video sequences. Features include conventional ones, such as scale invariant feature transform (SIFT), speeded-up robust features (SURF), and binary robust independent elementary features (BRIEF). It should be noted that conventional features are calculated directly from the input picture, such as pixel-based calculation of gradients, maxima or minima of luminance (or chrominance) for a picture or the like.

In recent years, deep neural network (DNN)-based features have sparked increased interest in particular for computer-vision purposes (also referred to as machine-vision). Such DNN-type features may be more generally referred to as machine-learning features, and resembles the fact that DNN-features are extracted and/or classified by machine-learning models, including DNNs or the like. On the other hand, in some applications humans are also employed to actually watch the videos in order to either look for information that CV algorithms might miss or to prove the correctness of the CV algorithms' results.

However, humans do not understand the features, which CV algorithms use to perform video image analysis, so that humans actually watch the videos at the server side (cloud). Therefore, in video surveillance, a video is (en)coded and transmitted (e.g. uploaded to a cloud server), and high quality features are also used for CV algorithms to provide fast and accurate image analysis results. Accordingly, in cases of multi-task collaborative intelligence where both computer-vision (CV) processing and image processing for human-vision (HV) are performed, efficient coding of features may be desirable so as to perform both processing operations of CV and HV.

SUMMARY

Embodiments of the invention are defined by the features of the independent claims, and further advantageous implementations of the embodiments by the features of the dependent claims.

According to an aspect of the present disclosure, an apparatus is provided for encoding an input picture, the apparatus comprising: a processing circuitry configured to: generate, for computer vision processing, base layer features of a latent space, wherein the generating of the base layer features includes processing the input picture with one or more base layer network layers of a trained network; generate, based on the input picture, enhancement layer features for reconstructing the input picture; and encode the base layer features into a base layer bitstream and the enhancement layer features into an enhancement layer bitstream.

One of the advantages of such encoding is the provision of two bitstreams which enable scalability with regard to possibly different usages of such resulting bitstreams: the base layer bitstream alone can be used for computer vision tasks, without necessity to obtain (decode or even receive) the enhancement layer features. On the other hand, when the picture reconstruction is desired, both bitstreams may be used.

For example, the processing circuitry is configured to: generate the enhancement layer features of the latent space by processing the input picture with one or more enhancement layer network layers of the trained network; and subdivide the features of the latent space into the base layer features and the enhancement layer features.

Dividing the latent space of the features resulting from processing the input picture by a trained network into two parts is a simple and efficient way of determining base layer features and enhancement layer features.

In some embodiments, the processing circuitry is configured to generate the enhancement layer features by: reconstructing a base layer picture based on the base layer features; and determining the enhancement layer features based on the input picture and the base layer picture.

In this way, the base layer features provided in the bitstream may also be used to determine enhancement layers, so that the correlation between those two can be exploited for a more efficient coding of the bitstream.

For example, the determining of the enhancement layer features is based on differences between the input picture and the base picture.

As a result, enhancement features may be encoded efficiently, by a simple difference calculation. Moreover, some existing residual coding approaches may be employed to encode such enhancement layer features.

For instance, the input picture is a frame of a video, and the processing circuitry is configured to generate the base layer features and the enhancement layer features (and optionally the respective base layer bitstream and enhancement layer bitstream) for a single frame or a plurality of frames of the video.

The frame-wise feature extraction along with the frame-based association of the feature bitstream and the video bitstream allows location of the feature in the reconstructed video based on the frame, from which the feature was extracted. This means that instead of decoding the entire video only the video frame containing the feature needs to be decoded.

The possibility of differential encoding provides the advantage of improving the compression ratio of video by using video images reconstructed from decoded features as predictors. In other words, the differential video encoding is very efficient.

According to an exemplary implementation, the processing circuitry is further configured to multiplex the base layer features and the enhancement layer features into a bitstream per frame.

Accordingly, the base layer features and enhancement layer features may be provided by the encoder in a single bitstream, but still in a separable manner. The frame-wise video-feature association enables a quick location of the feature in the video, respectively, the video bitstream.

As a result, the features corresponding to a video frame can be retrieved quickly and used to perform computer vision (CV) processing task. In addition, enhancement information can be used to reconstruct the corresponding video frame, from which it is possible to extract one or more additional features different from the image feature included in the feature bitstream. This improves further the performance of CV systems using image features for CV processing tasks, including subject and/or object detection and identification such as face recognition using facial features for example.

For example, the processing circuitry is further configured to encrypt a portion of a bitstream including the enhancement layer features.

The encryption of a portion of a bitstream may include encrypting the whole enhancement layer. Alternatively, one or more parts of the enhancement layer (i.e. one or more portions) may be encrypted. Accordingly, the picture reconstruction may be prohibited and the human-vision processing may be protected from unauthorized viewers (users).

According to an embodiment, an apparatus is provided for processing a bitstream, the apparatus comprising: a processing circuitry configured to: obtain a base layer bitstream including base layer features of a latent space and an enhancement layer bitstream including enhancement layer features; extract from the base layer bitstream the base layer features; and perform at least one out of: (i) computer-vision processing based on the base layer features; and (ii) extracting the enhancement layer features from the enhancement layer bitstream and reconstructing a picture based on the base layer features and the enhancement layer features.

The computer-vision processing based on the base layer features may include performing said CV processing using only the base layer features and not using the enhancement layer features.

Accordingly, the base layer feature may be obtained independently from the enhancement layer features because base features and enhancement features have been encoded in distinct, i.e. independent layers. Yet, both layers are encoded into the bitstream in distinct bitstreams. Therefore, the enhancement layer features may be obtained by extracting them on demand, i.e. only when it is required, for example, upon request.

For instance, the reconstructing of the picture includes: combining the base layer features and the enhancement layer features; and reconstructing the picture based on the combined features.

Accordingly, the latent space features are accessible via a common feature tensor.

In some embodiments, the computer-vision processing includes processing of the base layer features by one or more network layers of a first trained subnetwork.

Accordingly, the enhancement layers do not need to be provided, decoded, or used for computer vision tasks, thus reducing transmission and/or processing resources.

For example, the reconstructing of the picture includes processing the combined features by one or more network layers of a second trained subnetwork different from the first trained subnetwork.

Accordingly, the combined features used for the picture reconstruction may be processed by a trained subnetwork different from the subnetwork used for the computer-vision (CV) processing. Hence, using different trained subnetworks for computer-vision tasks and human-vision (HV) tasks makes the multi-task collaborative intelligence more flexible by training the CV subnetwork and HV subnetwork for their particular task.

For example, the reconstructing of the picture includes: reconstructing a base layer picture based on the base layer features; and adding the enhancement layer features to the base layer picture.

In this way, the base layer features provided in the bitstream may also be used to determine enhancement layers, so that the correlation between those two can be exploited for a more efficient picture reconstruction.

In some exemplary implementations, the enhancement layer features are based on differences between an encoder-side input picture and the base layer picture.

As a result, enhancement features may be decoded efficiently from simple differences. Moreover, some existing residual coding approaches may be employed to further decode such enhancement layer features.

For example, the reconstructed picture is a frame of a video, and the base layer features and the enhancement layer features are for a single frame or a plurality of frames of the video.

The frame-wise feature extraction along with the frame-based association of the feature bitstream and the video bitstream allows location of the feature in the reconstructed video based on the frame, from which the feature was extracted. This means that instead of decoding the entire video only the video frame containing the feature needs to be decoded.

For example, the processing circuitry is further configured to de-multiplex the base layer features and the enhancement layer features from a bitstream (e.g. a multiplexed bitstream comprising the base layer bitstream and the enhancement layer bitstream) per frame.

Accordingly, the base layer features and enhancement layer features may be obtained by the decoder from a single bitstream, but still in a separable manner. The frame-wise video-feature association enables a quick location of the feature in the video, respectively, the video bitstream. As a result, the features corresponding to a video frame can be retrieved quickly and used to perform computer vision (CV) processing task. In addition, enhancement information can be used to reconstruct the corresponding video frame, from which it is possible to extract one or more additional features different from the image feature included in the feature bitstream. This improves further the performance of CV systems using image features for CV processing tasks, including subject and/or object detection and identification such as face recognition using facial features for example.

For example, the processing circuitry is further configured to decrypt a portion of a bitstream including the enhancement layer features.

The decryption of a portion of a bitstream may include decrypting the whole enhancement layer. Alternatively, one or more parts of the enhancement layer (i.e. one or more portions) may be decrypted. Accordingly, the portion of the bitstream entailing the enhancement layer features are accessible only by decryption. Hence, the input picture may be only reconstructed and hence made available for human-vision processing after decryption by authorized users. As a result, the privacy of human-vision processing is ensured.

According to an embodiment, a method is provided for encoding an input picture, the method comprising: generating, for computer vision processing, base layer features of a latent space, wherein the generating of the base layer features includes processing the input picture with one or more base layer network layers of a trained network; generating, based on the input picture, enhancement layer features for reconstructing the input picture; and encoding the base layer features into a base layer bitstream and the enhancement layer features into an enhancement layer bitstream.

According to an embodiment, a method is provided for processing a bitstream, the method comprising: obtaining a base layer bitstream including base layer features of a latent space and an enhancement layer bitstream including enhancement layer features; extracting from the base layer bitstream the base layer features; and performing at least one out of: (i) computer-vision processing based on the base layer features; and (ii) extracting the enhancement layer features from the enhancement layer bitstream and reconstructing a picture based on the base layer features and the enhancement layer features.

The methods provide similar advantages as the apparatuses performing the corresponding steps and described above.

A computer-readable non-transitory medium storing a program, including instructions which when executed on one or more processors cause the one or more processors to perform the method according to any embodiments or examples herein.

According to an embodiment, an apparatus is provided for encoding an input picture, the apparatus comprising: one or more processors; and a non-transitory computer-readable storage medium coupled to the one or more processors and storing programming for execution by the one or more processors, wherein the programming, when executed by the one or more processors, configures the encoder to carry out the method according to any embodiments or examples herein.

According to an embodiment, an apparatus is provided for processing a bitstream, the apparatus comprising: one or more processors; and a non-transitory computer-readable storage medium coupled to the one or more processors and storing programming for execution by the one or more processors, wherein the programming, when executed by the one or more processors, configures the apparatus to carry out the method according to any embodiments or examples herein.

According to an aspect of the present disclosure, provided is a computer-readable non-transitory medium for storing a program, including instructions which when executed on the one or more processors cause the one or more processors to perform the method steps mentioned above.

Moreover, the invention relates to a computer program comprising program code for performing the method according to any embodiments or examples mentioned herein when executed on a computer.

The invention can be implemented in hardware (HW) and/or software (SW) or in any combination thereof. Moreover, HW-based implementations may be combined with SW-based implementations.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the invention are described in more detail with reference to the attached figures and drawings, in which:

FIG. 9 is an example illustration of an input picture and base feature data for one of the embodiments of the invention.

FIG. 10 is an example illustration of an input picture and feature data for one of the embodiments of the invention.

FIG. 16 is a block diagram of an encoder with processing circuitry including a CV generating module, HV generating module, and a CV-HV encoding module.

FIG. 17 is a block diagram of a bitstream processing apparatus with processing circuitry including an obtaining module, CV extracting module, CV processing module, HV extracting module, and HV reconstructing module.

FIG. 18 is a flowchart of an encoding method of an input picture.

FIG. 19 is a flowchart of a processing method for processing a bitstream.

FIG. 22 is a block diagram illustrating another example of an encoding apparatus or a decoding apparatus.

DETAILED DESCRIPTION OF THE EMBODIMENTS

Figure 1:
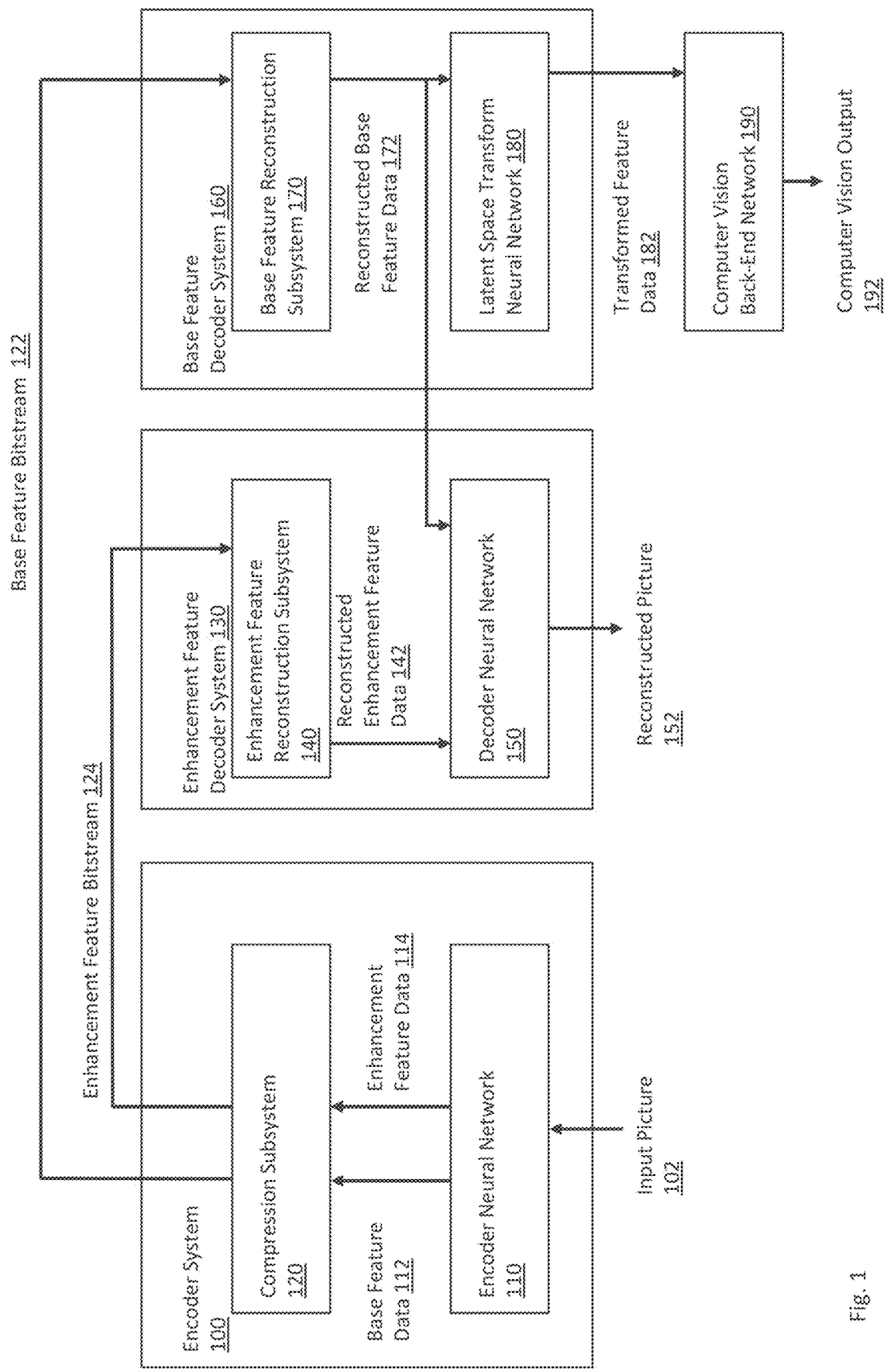
FIG. 1 is a block diagram showing an example of an encoder and a corresponding decoder configured to implement one embodiment of the invention.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Some embodiments of the present disclosure may enable to perform computer vision analysis (CV processing) via computer vision algorithms more efficiently, accurately and reliably, as a result of using high-quality image features. These image features are determined at the side, where the video is taken by a camera and the image feature is extracted e.g. from the uncompressed (i.e. undistorted) video as commonly performed. Therefore, typical computer vision tasks, such as object detection and face recognition may be performed with high accuracy.

For such computer vision tasks it may be desirable that one or a plurality of image features are of high quality, in order to achieve a high precision in application such as video surveillance, computer vision feature coding, or autonomous driving, for example.

At the same time, it may be desirable that the extracted high quality image features are encoded (compressed) efficiently to assure that a computer vision task can operate with fewer bits of information. This is accomplished by some embodiments and exemplary implementations of the present disclosure where features are encoded into a base feature bitstream or a base layer bitstream, which requires fewer bits than encoding the input video.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission errors or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2-D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter-predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

The encoding and decoding which may make use of the present disclosure, i.e. the compression and decompressions of video images is also relevant for applications, including video surveillance, where still and/or moving target objects need to be detected and identified. In present video surveillance solutions, videos are compressed at the terminal side (user or client), for example, at the camera or the like, and transmitted to servers, which may be part of a cloud. At the cloud side, the compressed video are then reconstructed and/or analyzed further for computer vision. The encoding and decoding of parts of the video or some features, may be performed by standard video encoders and decoders, compatible with H.264/AVC, HEVC (H.265), WC (H.266) or other video coding technologies, for example.

Besides surveillance applications, remote monitoring, smart home, edge-cloud collaborative vision applications or the like also employ computer vision (CV) algorithms which are utilized for object detection or face recognition and used to extract useful information from the videos, i.e. the video images. The typical detection and recognition CV algorithms are fundamentally based on features extracted from the videos, or more accurately speaking, from the individual frames of the video sequences.

While different kind of features have been used, including conventional features (e.g. SURF, BRIEF etc.), deep neural network (DNN)-based features have received increased interest in particular for computer-vision purposes (also referred to as machine-vision). Such DNN-type features may be more generally referred to as machine-learning features, and resembles the fact that DNN-features are extracted and/or classified by machine-learning models, including DNNs or the like. In many applications, humans are still employed to actually watch the videos in order to either look for information that CV algorithms might miss or to prove the correctness of the CV algorithms' results.

Hence, in these applications, the machine vision provides the analytics, such as person and/or object detection, segmentation, or tracking, which can operate on a continuous basis, while the human-level vision may be performed occasionally to verify machine-vision analytics or provide higher-level assessment in critical situations, such as a traffic accident.

Often, a machine-vision task does not require as much information as is necessary for high-quality human viewing. For example, for successful detection of objects in the scene, precise reconstruction of all pixels in the image might not be needed. In turn, for high-quality human viewing, one might need to provide fairly good reconstruction of all the pixels, since humans do not understand the features, which CV algorithms use to perform video image analysis. Hence, high quality features are to be used so that humans can actually watch the videos at the server side (cloud). Therefore, in video surveillance, a video is (en)coded and transmitted (e.g. uploaded to a cloud server), and high quality features are also used for CV algorithms to provide fast and accurate image analysis results.

Current technologies continue to be inefficient since features and input images/video are coded separately, possibly causing redundancy. Further, joint-coding of features and input images or video have been only explored in a few cases, namely handcrafted features (SIFT or edge segments) and face features (e.g. as an enhancement to image/video.

However, features supporting multiple tasks are still largely unexplored. Accordingly, for multi-task collaborative intelligence where both computer-vision (CV) processing and image processing for human-vision (HV) are performed, there is a need for an efficient coding of features so as to support and perform both processing operations of CV and HV. In particular, efficient coding methods are needed for scalable representation of features, where subsets of tasks can be supported without full feature reconstruction.

As will be detailed below, some of the embodiments and examples of the present disclosure solves the above problems by efficiently coding a video bit stream for both human and machine vision. In particular, the machine-vision-related information is coded as a base layer, and the extra information needed for human vision is coded as the enhancement layer on the encoding side. The present disclosure provides apparatuses and methods for performing such scalable (en)coding, enabling a latent-space scalability for efficient representation and processing of features in multi-task collaborative intelligence. On the decoding side (e.g. cloud server), a whole latent or part thereof may be decoded selectively, as needed for human and machine vision, respectively. Thereby the bitstream is organized in a scalable manner, namely in a base layer for computer vision (object detection) and an enhancement layer for human vision.

The term "scalable" herein means that the encoder produces a bitstream that can support both computer vision processing and input picture reconstruction (e.g. for human vision HV), and the operation of the decoder can be scaled to support either of these processing tasks, or both. For the purposes of this disclosure, a picture or video is considered to be "reconstructed" (or suitable for human viewing) if it is sufficiently close to the input picture/video in a perceptual sense. Perceptual closeness of two pictures or videos may be measured by a variety of metrics, such as Mean Squared Error (MSE), Mean Absolute Error (MAE), Peak Signal to Noise Ratio (PSNR), Structural Similarity Index Metric (SSIM), or any other objective or subjective perceptual quality metric known in the art.

The term "computer vision processing" (also known as "machine vision processing" or "machine vision") refers to computational analysis of the input picture or video for one or more of the following purposes: image classification, person or object detection, depth or distance estimation, object tracking, object segmentation, semantic segmentation, instance segmentation, facial feature extraction, face recognition, person identification, action recognition, anomaly detection, and so on. In computer vision processing, the input is a picture or a sequence of pictures (video) or latent-space feature data, and the output is, for example, an object class label and/or a set of bounding boxes for objects in the picture(s) and/or a set of facial landmarks, and/or other analysis, depending on a particular computer vision task.

In the following, exemplary embodiments of a scalable coding system for video and associated computer vision processing features are described.

Scalable Coding for Computer Vision Processing and Picture Reconstruction

According to an embodiment of the present disclosure, an apparatus is provided for encoding an input picture. The input picture may be a still or a video picture. The respective picture may include one or more samples (i.e. pixels).

FIG. 16 shows a block diagram of encoding apparatus 1600 for encoding an input picture. The apparatus 1600 comprises a processing circuitry 1610 configured to: generate, for computer vision processing, base layer features of a latent space. The generating of the base layer features includes processing the input picture with one or more base layer network layers of a trained network. The base layer network layers may be network layers of the trained network such as a neural network or sub-network. In general, the base layer network layers may be layers of any kind of trained processing network (e.g. based on machine learning or deep learning) which contribute to obtaining base layer features.

The processing circuitry 1610 is further configured to generate, based on the input picture, enhancement layer features for reconstructing the input picture. The input picture reconstruction herein refers to reconstruction of picture samples (sometimes also referred to as pixels). The reconstructed picture in the sample domain is then suitable for human vision. The present disclosure is not limited to any particular approach of generating the enhancement features. Several embodiments and examples are provided below.

The processing circuitry 1610 is further configured to encode the base layer features into a base layer bitstream and the enhancement layer features into an enhancement layer bitstream. Such scalable encoding into base layer features and enhancement layer features enables efficient transmission and processing of the bitstream by either or both of the computer vision processing devices and human vision destined devices which reconstruct the picture.

In one exemplary implementation of apparatus 1600 shown in FIG. 16, the configuring of processing circuitry 1610 may include that said circuitry includes respective modules for the processing. This may include a generating module 1612 for generating base layer features used for computer-vision purposes, a generating module 1614 for generating enhancement layer features used for reconstructing the picture, and an encoding module 1616 which encodes the base layer features and enhancement layer features into separate bitstreams, namely a base layer bitstream and an enhancement layer bitstream. Such modules may be logical and functional. However, it is conceivable to provide these modules also in physically separate manner, including combination of hardware and/or software.

The computer-vision (CV) processing relates to processing of the picture using the base layer features of the latent space. In contrast, the enhancement layer features are used for reconstructing the input picture (e.g. at the decoder side) which takes place in sample domain (sample space or pixel space) as opposed to the latent-space.

Base layer features may include, for example, key points coordinates, key points semantics of an object included in the input image. For example, key points coordinates may include coordinates of joints of a human body (e.g. elbow, hand, shoulder, knee, etc.). Key points semantics may include respective labels "elbow", "hand", etc. Base layer features may also include separate sets of points, marking an edge of a human chin, (upper or lower) lips, eye lid, eye brows or the like. The base layer features may also include a triangular net obtained from the key points coordinates and used to represent the facial surface of a human body. The base layer features also may include boundary boxes, which contain upper-left and bottom-right coordinates of an area that covers the object and a corresponding object label. Another data that the base layer features may include is a semantic segmentation, which is a pixel-level object identification.

It is clear for those skilled in the art that other kind of base layer features may be generated by processing the input picture via a trained network and suitable for machine-vision processing. Hence, base layer features relate to features that are not or hardly suitable for being understood or interpreted by humans as picture. In other words, base layer features may be low-level as they allow a processing by machines to perform their intended task (e.g. surveillance etc.), but not for humans.

In turn, enhancement layer features (EL features) are providing information for human vision and may be based on the base layer features. EL features entail more detailed information (while not complete) so that the original picture may be reconstructed and hence interpreted (i.e. viewed and assessed) by humans. For example, the above-mentioned key points may be used to generate a high-quality representation of the facial surface of an object, suitable for a human to recognize the respective person. The EL features may also include color information, color grading etc. of the input picture.

The trained network may any machine-learning-based network and/or deep-learning-based framework that may be pre-trained by providing learning data (test data) as input to the network so as to obtain a trained network model, represented by parameters as a result of the pre-training. The trained network may, for example, be a neural network (NN), artificial neural network (ANN), convolutional neural network (CNN), a fully connected neural network (FCN) or the like.

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. In ANN implementations, the "signal" at a connection is a real number, and the output of each neuron can be computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Overtime, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

A CNN, as the name "convolutional neural network" suggests, employs a mathematical operation called convolution. Convolution is a specialized kind of linear operation. Convolutional networks are simply neural networks that use convolution in place of general matrix multiplication in at least one of their layers. A convolutional neural network consists of an input and an output layer, as well as multiple hidden layers. Input layer is the layer to which the input is provided for processing.

Figure 12:
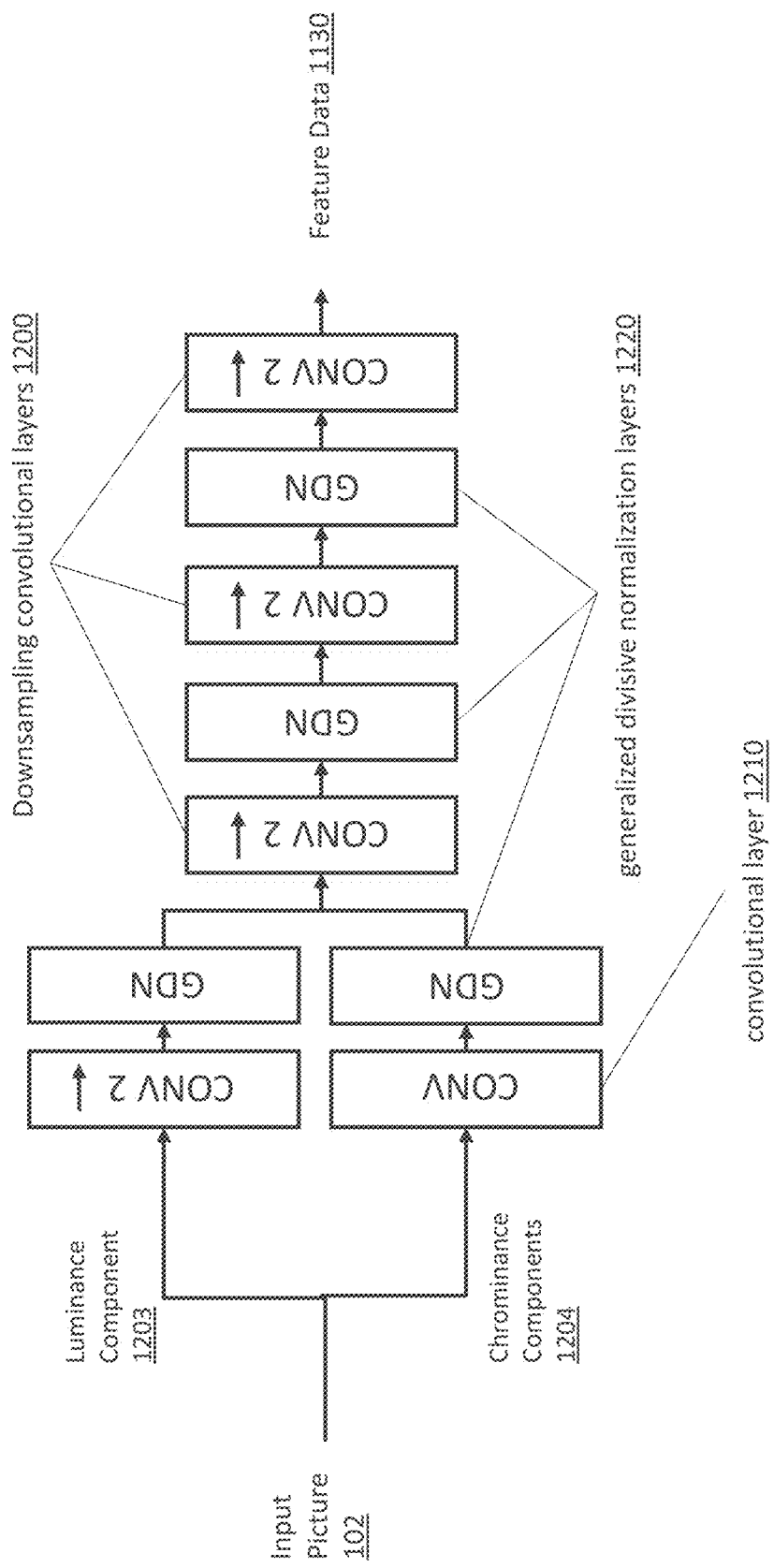
FIG. 12 is an example implementation of a layer configuration of an analysis encoder capable of handling YUV 420 format.
Figure 13:
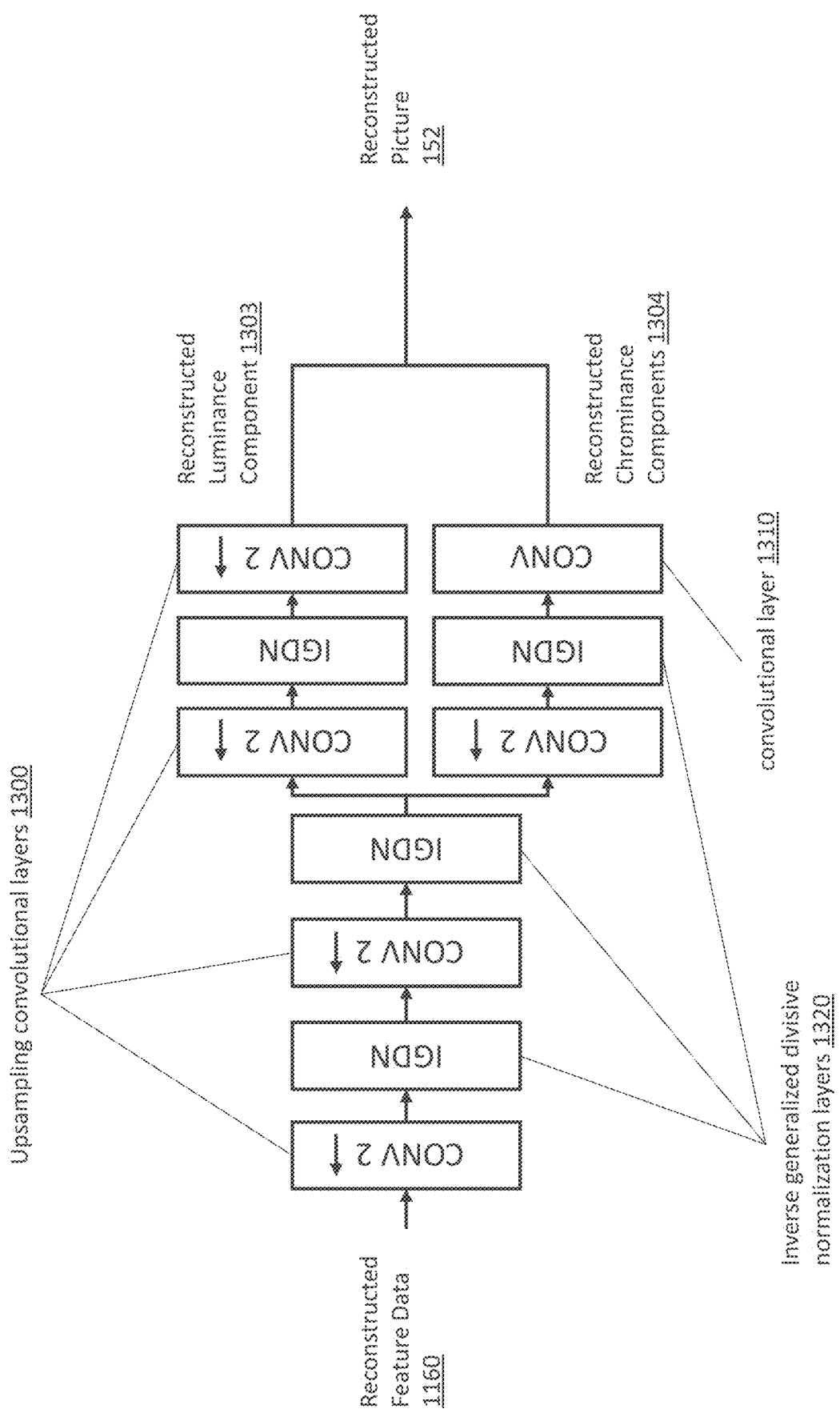
FIG. 13 is an example implementation of a layer configuration of a synthesis decoder capable of handling YUV 420 format.
Figure 14:
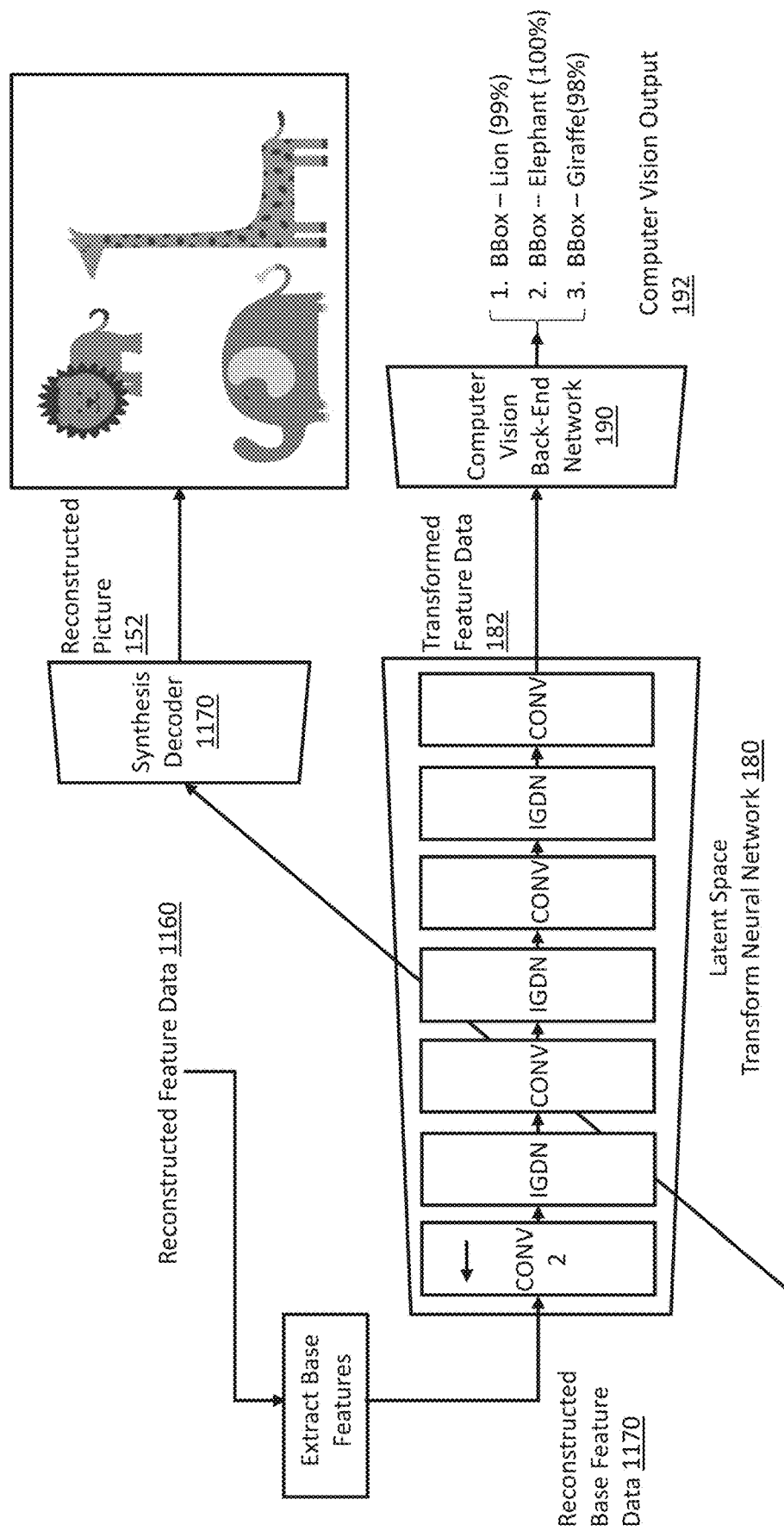
FIG. 14 is an example implementation of a layer configuration of latent transform and multi-task with latent space scalability. A latent-space feature vector including base and enhancement features, is used for picture reconstruction, while only base features are used for object detection.

For example, some neural network which may be used in connection with embodiments and examples of the present disclosure are illustrated in FIGS. 12 to 14. They are CNN in structure. While CNNs may be particularly suitable for some computer vision tasks and may be also applicable for encoding features for human vision, the present disclosure is not limited to such networks. Some specific computer vision tasks may be performed by other frameworks/networks and the human vision relevant part (enhancement layer feature coding) may even profit from employing classical picture/video coding approaches or some specific kinds of machine learning processing. The hidden layers of a CNN typically consist of a series of convolutional layers that convolve with a multiplication or other dot product. The result of a layer is one or more feature maps, sometimes also referred to as channels. There may be a subsampling involved in some or all of the layers. As a consequence, the feature maps may become smaller. The activation function in a CNN may be a RELU (Rectified Linear Unit) layer or a generalized divisive normalization (GDN) layer, and may subsequently be followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

The GDN layer perform the following transformation:

$$y_i = \gamma \frac{x_i^\alpha}{\beta^\alpha + \Sigma_j x_j^\alpha}$$

where $\alpha$, $\beta$ and $\gamma$ are trainable parameters, $x_i$ is an input of the layer, $y_i$ is an output the layer.

When programming a CNN for processing pictures or images, the input is a tensor with shape (number of images)×(image width)×(image height)×(image depth). Then, after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 down-samples at every depth slice in the input by 2 along both width and height, discarding 75% of the activations. In this case, every max operation is over 4 numbers. The depth dimension remains unchanged.

In addition to max pooling, pooling units can use other functions, such as average pooling or $\ell 2$-norm pooling. Average pooling was often used historically but has recently fallen out of favour compared to max pooling, which performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since they has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

The latent space refers to a space of features (e.g. feature maps) generated e.g. in the bottleneck layer of the trained network (e.g. a neural network) which provides data compression. This is illustrated schematically in the example shown in FIG. 15. In the case of the NN topologies, where the purpose of the network is the reduction of dimensionality of the input signal, the bottleneck layer usually refers to the layer at which the dimensionality of the input signal is reduced to a minimum (which may be a local or a global minimum within a network). The purpose of the reduction of dimensionality is usually to achieve a more compact representation of the input (data compression). Therefore, the bottleneck layer is a layer that is suitable for compression, and therefore in the case of video coding applications, the bitstream is generated based on the bottleneck layer. However, the term latent space does not necessarily refer to bottleneck. In general, a latent space is a space of features after processing by one or more network layers (as opposite to the samples of the original input picture). It is not necessary that the latent space is generated by the output layer, it may be also any of the hidden layers. While bottleneck features provide the advantage of compressing the picture information, for some computer vision tasks, suitability of the features for the computer vision may be of a primary concern. Feature maps are generated by applying filters (kernels) or feature detectors to the input image or the feature map output of the prior layers. Feature map visualization provides insight into the internal representations for a specific input for each of the convolutional layers in the model. In general terms, a feature map is an output of a neural network layer. A feature map typically includes one or more feature elements also referred to as features.

Figure 15:
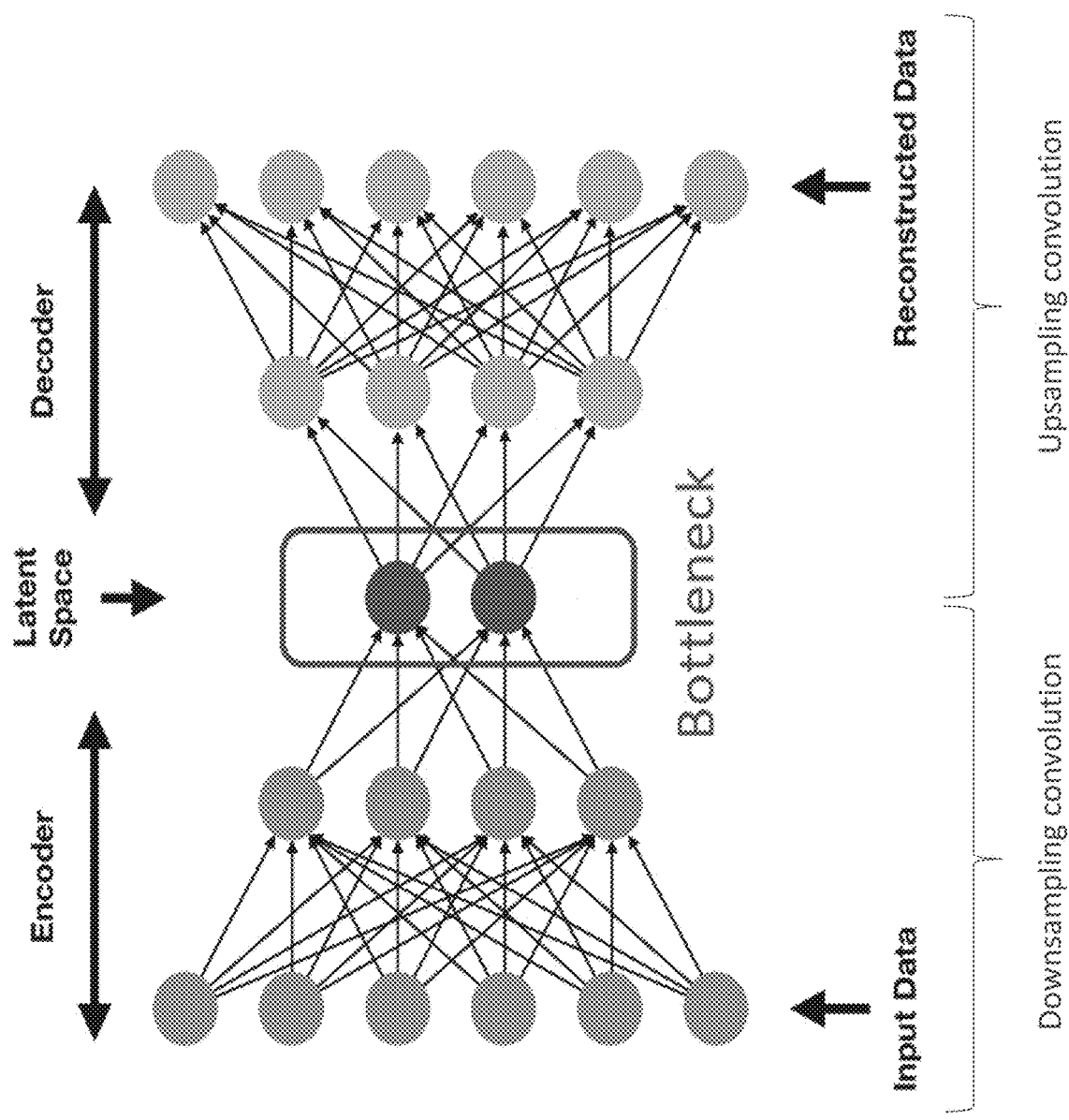
FIG. 15 is an illustration of a latent space.

FIG. 15 exemplifies the general principle of data compression. The latent space, which is the output of the encoder and input of the decoder, represents the compressed data. It is noted that the size of the latent space may be much smaller than the input signal size. Here, the term size may refer to resolution, e.g. to a number of samples (elements) of the feature map(s) output by the encoder. The resolution may be given as a product of number of samples per each dimension (e.g. width×height×number of channels of an input image or of a feature map). Deep learning-based video/image compression methods employ multiple downsampling layers as well as upsampling layers, as illustrated in FIGS. 12 and 13. The input data of FIG. 15 may be picture samples. The latent space may be the output layer (bottleneck) and then a picture may be also reconstructed from the latent space data (features). However, as is described in more detail below, the latent space may be any hidden layer and then, the reconstruction may not result in reconstructed picture which would be suitable for human vision. Rather, such reconstruction may lead to a mere visualization of the latent space features.

Downsampling is a process where the sampling rate of the input signal is reduced. For example, if the input image has a size of h and w, and the output of the downsampling is h2 and w2, at least one of the following holds true:

h2<h w2<w

The reduction in the signal size usually happens step by step along the chain of processing layers, not all at once. For example, if the input image x has dimensions (or size of dimensions) of h and w (indicating the height and the width), and the latent space y has dimensions h/16 and w/16, the reduction of size might happen at 4 layers during the encoding, wherein each layer reduces the size of the signal by a factor of 2 in each dimension.

Upsampling is a process, where the sampling rate (sampling interval) of the discrete input signal is increased. For example, if the input image has a size of h and w, and the output of the downsampling has a size h2 and w2, at least one of the following holds true:

h2>h
w2>w

The reduction in the size of the input signal is exemplified in FIG. 15, which represents a deep-learning based encoder and decoder. In FIG. 15, the input image x corresponds to the input Data, which is the input of the encoder. The transformed signal y corresponds to the Latent Space, which has a smaller dimensionality or size in at least one dimension than the input signal. Each column of circles represent a layer in the processing chain of the encoder or decoder. The number of circles in each layer indicate the size or the dimensionality of the signal at that layer. One can see from FIG. 15 that the encoding operation corresponds to a reduction in the size of the input signal (via downsampling), whereas the decoding operation corresponds to a reconstruction of the original size of the image (via upsampling).

Figure 4:
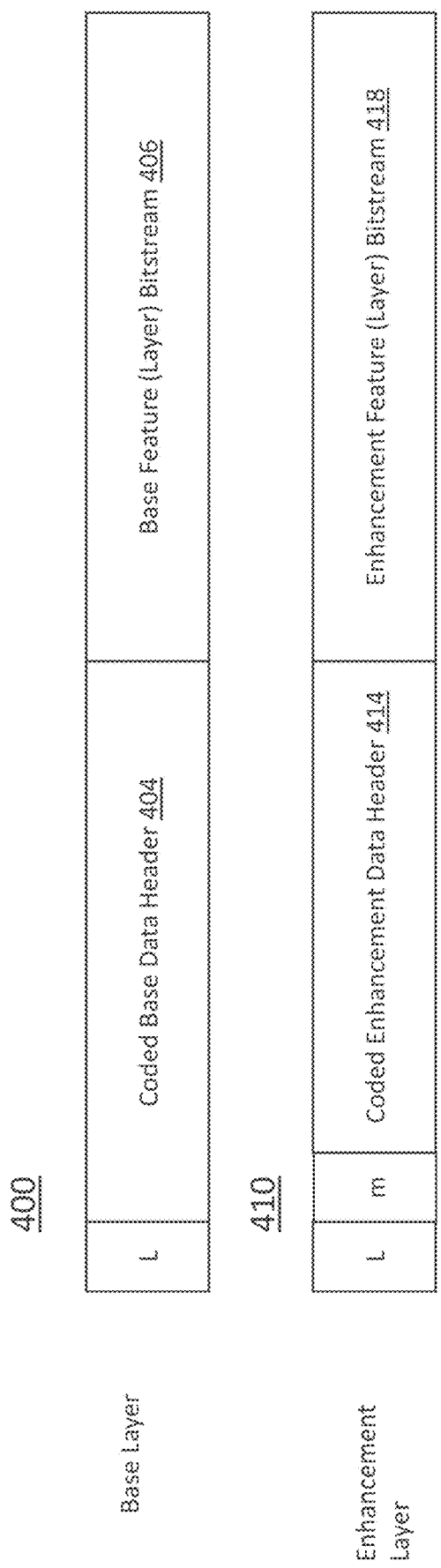
FIG. 4 is an illustration of the syntax of the metadata containers.

The base layer features and enhancement layer features may be encoded into the respective base layer bitstream and enhancement layer bitstream, which may be separate or separate (e.g. separable without complete decoding) data containers of a bitstream. FIG. 4 shows an exemplary embodiment of the syntax of the data containers 400 and 410, for the base layer and enhancement layer data, respectively. In the following, the terms base layer bitstream and base feature bitstream are used synonymously. Likewise, the terms enhancement layer bitstream and enhancement feature bitstream are used synonymously. The data container syntax is explained in more detail further below.

Enhancement Layer Features Generated by Network Layers

FIG. 1 is a schematic block diagram illustrating an embodiment of a scalable coding system, wherein the coding system comprises an encoder system 100 configured to provide base feature bitstream 122 and enhancement feature bitstream 124. The base feature bitstream 122 can be decoded by the base feature decoder system 160, and the enhancement feature bitstream 124 can be decoded by the enhancement feature decoder 130.

The input picture 102 may be produced by any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture", unless specifically described otherwise, while the previous explanations with regard to the term "picture" covering "video pictures" and "still pictures" still hold true, unless explicitly specified differently.

In an exemplary implementation, the input picture is a frame of a video, and the processing circuitry is configured to generate the base layer features and the enhancement layer features (and optionally the respective base layer bitstream and enhancement layer bitstream) for a plurality of frames of the video. Moreover, in a further exemplary implementation, the processing circuitry is configured to multiplex the base layer features and the enhancement layer features into a bitstream per frame. However, the present disclosure is not limited thereto and the multiplexing may be per predetermined number of frames. Accordingly, the base layer features and enhancement layer features may be provided by the encoder in a single bitstream. It may be advantageous, to provide the base layer features as accessible separately from the enhancement layer features, so that decoding of the enhancement features is not necessary in order to parse and decode the base layer features. This may be achieved by syntax and, e.g. by appropriate design of entropy coding, if applied.

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or luma, for short) component Y represents the brightness or grey level intensity (e.g. like in a grey-scale picture), while the two chrominance (or chroma, for short) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

Input picture 102 may be produced, for example by a camera for capturing a picture, or read from a memory, e.g. a picture memory, comprising or storing a previously captured or generated picture, and/or any kind of interface (internal or external) to obtain or receive a picture. The camera may be, for example, a local or integrated camera integrated in a sensor or source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol.

According to an exemplary implementation of the present disclosure, the processing circuitry is configured to: generate the enhancement layer features of the latent space by processing the input picture with one or more enhancement layer network layers of the trained network; and subdivide the features of the latent space into the base layer features and the enhancement layer features.

FIG. 1 illustrates input picture 102 being input to encoder neural network 110 corresponding to a trained network, which processes the input picture and provides as output two kinds of feature data, corresponding to base features 112 and enhancement features 114. Base and enhancement features belong to features of the latent space.

FIG. 12 exemplifies the processing of the input picture 102 further by example of luminance component and chrominance component of the input picture. In the example, the trained network includes multiple downsampling convolution layers 1200 with GDN layer 1220 in between. The output of the trained network in this case is feature data 1130, which includes both the base layer features and enhancement layer features. Note that feature data 1130 correspond to reconstructed feature data 1160 of FIG. 13 and FIG. 14, used as input at the decoder side. With respect to FIG. 1, the feature data 1130 includes base and enhancement layer features 112 and 114. At the end of the encoder neural network, the feature data, i.e. the entire latent space features is then partitioned into two feature data sets, i.e. the base feature data 112 and enhancement feature data 114.

It is noted that FIG. 12 is only one of possible exemplary implementations. The base feature data 112 and the enhancement feature data 114 may be subsets of the feature data from a single network layer. However, it is conceivable that the base layer features are output from a network layer located (in processing order) before the layer outputting the enhancement layer features.

FIG. 1 shows that input picture 102 may be pre-processed by a pre-processing unit, which may be configured to receive the (raw) picture data and to perform preprocessing on the picture data to obtain a pre-processed picture or pre-processed picture data. Pre-processing performed by the pre-processing unit may, e.g., comprise trimming, color format conversion (e.g. from RGB to YCbCr), color correction, or de-noising. In general, the present disclosure is not limited to inputting more than one color components (channels). Gray-scale images or even black-white images may be processed instead. It is further noted that embodiments are conceivable in which only one color channel (e.g. luminance channel) is processed to obtain base layer features, whereas more than one color channels are processed to obtain enhancement layer features. Particular implementation may depend on the desired computer vision task.

The encoder system 100 is configured to receive the input picture 102, optionally preprocessed, and provide base feature bitstream 122 and enhancement feature bitstream 124.

These bitstreams may be transmitted to another device, e.g. the destination device or any other device, for storage or direct reconstruction, or to process the base feature bitstream 122 and/or the enhancement feature bitstream 124 for respectively before storing the encoded bitstreams and/or transmitting the encoded bitstreams to another device, e.g. the destination device or any other device for decoding or storing.

The destination device comprises a base feature decoder system 160 and optionally an enhancement feature decoder system 130, and may additionally, i.e. optionally, comprise a communication interface or communication unit, a post-processing unit and a display device.

The communication interface of the destination device is configured to receive the base feature bitstream 122 and optionally the enhancement feature bitstream 124, e.g. directly from the encoder system 100 or from any other source, e.g. a storage medium, a memory, e.g. an encoded bitstream memory.

The communication interfaces of the encoder system 100 and the decoder systems 130 and 160 may be configured to transmit respectively receive the base feature bitstream 122 and/or the enhancement feature bitstream 124 via a direct communication link between the encoding device and the decoding device, e.g. a direct wired or wireless connection, or via any kind of network, e.g. a wired or wireless network or any combination thereof, or any kind of private and public network, or any kind of combination thereof.

The communication interface at the encoder side may be, e.g., configured to package the base feature bitstream 122 and optionally the enhancement feature bitstream 124 into an appropriate format, e.g. packets, for transmission over a communication link or communication network, and may further comprise data loss protection and data loss recovery. The two bitstreams may also be multiplexed.

The communication interface at the decoder side, forming the counterpart of the communication interface at the encoder side, may be, e.g., configured to de-multiplex and de-package the encoded bitstreams to obtain the base feature bitstream 122 and optionally the enhancement feature bitstream 124, and may further be configured to perform data loss protection and data loss recovery, e.g. comprising error concealment or packet loss concealment.

Both communication interfaces at the encoder side and the decoder side may be configured as unidirectional communication interfaces as indicated by the arrows for the base feature bitstream 122 and the enhancement feature bitstream 124 in FIG. 1 pointing from the encoder system 100 to the decoder systems 130 and 160, or bi-directional communication interfaces, and may be configured, e.g. to send and receive messages, e.g. to set up a connection, to acknowledge and/or re-send lost or delayed data, and exchange any other information related to the communication link and/or data transmission, e.g. base and enhancement feature data transmission.

It is noted that a decoder side does not have to include both base feature decoding system 160 and enhancement layer decoding system 130. For computer vision processing tasks a device may implement only the base feature decoding system 160. In such cases, it is conceivable to only receive base layer feature bitstream. However, it is also conceivable to receive (obtain) a bitstream including both containers (base layer feature bitstream and enhancement layer feature bitstream) and to extract (parse) and decode only the base layer feature bitstream. For the human vision tasks (picture reconstruction), both decoding systems 160 and 130 may be included as shown in FIG. 1. Alternatively, a decoding system only for picture reconstruction may be provided which does not perform a machine vision task, but merely decodes both base layer features and enhancement layer features and reconstructs a picture accordingly.

According to an embodiment of the present disclosure, an apparatus is provided for processing a bitstream.

FIG. 17 shows a block diagram of an apparatus 1700 for the bitstream processing. The apparatus comprises a processing circuitry 1710 configured to: obtain a base layer bitstream including base layer features of a latent space and an enhancement layer bitstream including enhancement layer features. The processing circuitry 1710 is further configured to extract from the base layer bitstream the base layer features; and perform at least one out of: (i) computer-vision processing based on the base layer features; and extracting the enhancement layer features from the enhancement layer bitstream and (ii) reconstructing a picture (samples of the picture) based on the base layer features and the enhancement layer features.

The computer-vision processing based on the base layer features may include performing said CV processing using only the base layer features and not using the enhancement layer features.

In one exemplary implementation of apparatus 1700 shown in FIG. 17, the configuring of processing circuitry 1710 may include that said circuitry includes respective modules for the processing. This may include obtaining module 1712 for obtaining the base layer bitstream, extracting module 1714 for extracting base layer features from said base layer bitstream, and CV processing module 1716 for performing the computer-vision processing of the base layer features. The modules may include further extracting module 1718 for extracting enhancement layer features from the enhancement layer bitstream. Reconstruction module 1720 may then reconstruct the picture based on the base layer features and the enhancement layer features.

The reconstruction of the picture may be performed in a sample (pixel) domain. The enhancement layer feature may be also of a latent space (e.g. as described above with reference to FIG. 14).

Accordingly, the base layer feature(s) may be obtained independently from the enhancement layer features because base features and enhancement features have been encoded in distinct, i.e. independent layers. Yet, both layers are encoded into the bitstream or in distinct bitstreams. Therefore, the enhancement layer features may be obtained by extracting them on demand, i.e. only when it is required, for example, upon request from a device corresponding to the decoding system (130).

Figure 5:
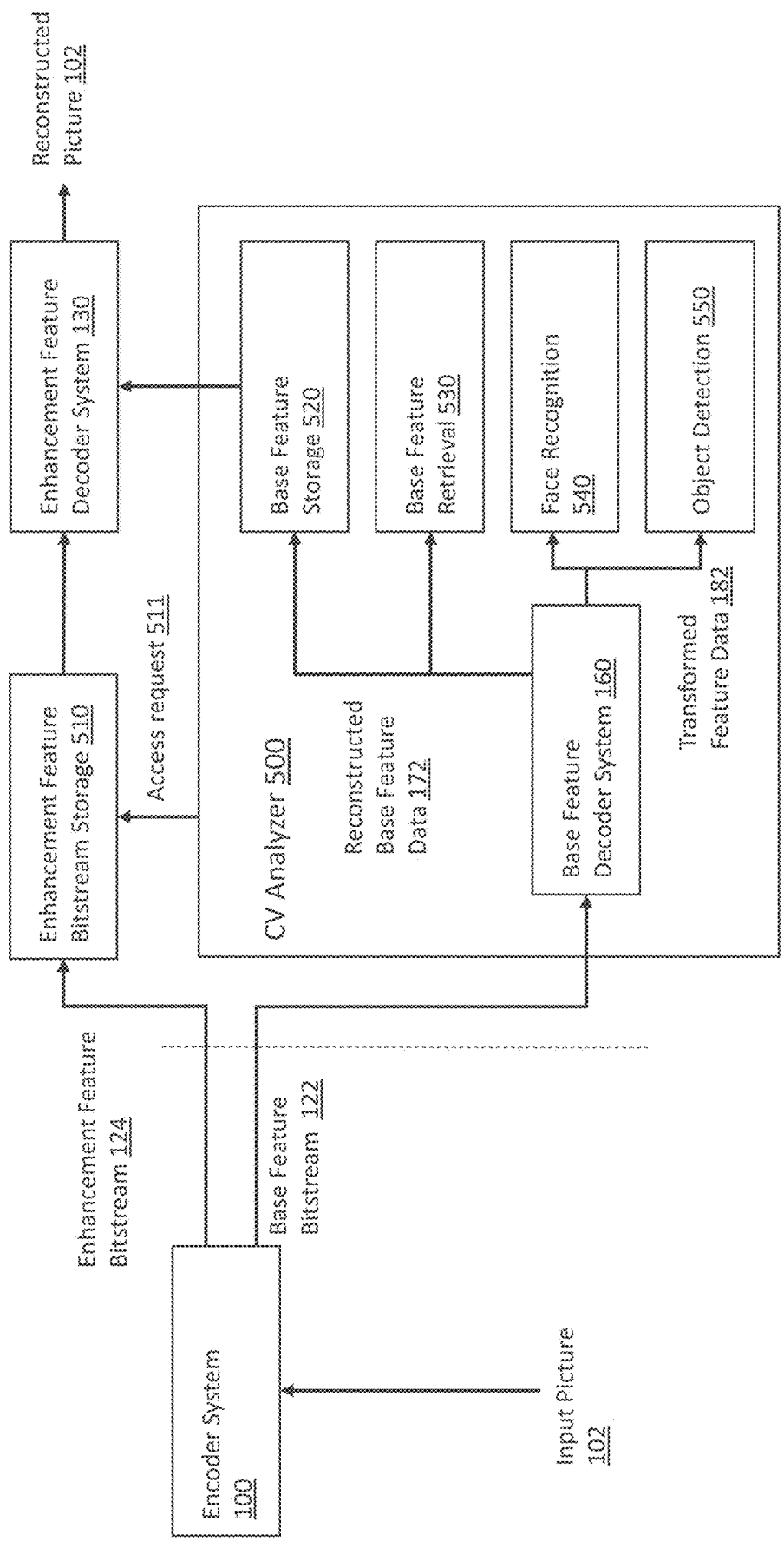
FIG. 5 is a block diagram of a computer vision processing system, including a scalable feature and video encoder and decoder, performing computer vision analysis of a video based on image features in the base feature bitstream and optionally reconstructing video using enhancement features in the enhancement feature bitstream.

FIG. 5 shows such an request-based access of the enhancement layer features where the CV analyzer 500 performs the computer-vision processing of the base layer features and may trigger the picture reconstruction by sending access request 511 to Enhancement Feature Bitstream Storage 510.

The decoder systems 160 and 130 are configured to receive respectively the base feature bitstream 122 and the enhancement feature bitstream 124 and provide transformed feature data 182 and optionally a reconstructed picture 152.

According to an implementation, the reconstructing of the picture includes: combining the base layer features and the enhancement layer features; and reconstructing the picture based on the combined features.

Thus, the combined features are latent space features, implying that one or more features of the latent space are features provided as output from e.g. hidden layers of the trained network of the encoder side. The combining of base and enhancement features may include merging base layer features and enhancement layer features. Accordingly, the latent space features are accessible via a common feature tensor. In FIG. 14, said common feature tensor corresponds to the reconstructed feature data 1160, which is input to syntax decoder 1170 to reconstruct the picture.

In another implementation example, the computer-vision processing includes processing of the base layer features by one or more network layers of a first trained subnetwork.

The first trained subnetwork may be a network based on machine-learning, including NN, CNN, FCNN, etc. similar to the trained network of the encoder side. The term subnetwork is not interpreted in a limiting sense, meaning the term subnetwork may be on the one hand a part of a (main) network performing both CV and HV processing tasks. In this case, the CV subnetwork is understood as a subnetwork. Alternatively, the first subnetwork may be a separate network, which may not interact with other networks at the decoder side when performing CV processing.

The first trained subnetwork may be configured in a similar manner as the trained network of the encoder side, including one or more convolutional layers and inverse GDN layers to transform base layer features into transformed feature data 182 as shown in FIG. 14. Apart from the first sub-network, the computer vision processing further includes the back-end sub-network 190 which performs some computer vision processing. Thus, the first sub-network and the sub-network 190 may form a network, or they may be considered as two separate networks.

FIG. 1 shows base feature bitstream 122 input to base feature decoder system 160, which extracts by reconstruction the base layer features from the base layer bitstream. The respective base layer features are input to the latent-space transform neural network 180, which corresponds to the first trained subnetwork. The transformed features data 182 are then input to a CV back-end network 190 which processes the feature data and provides CV output 192. The first sub-network 180 and the network 190 may be trained jointly. However, it is conceivable that they may be also trained separately.

FIG. 14 shows an example implementation of such a transform neural network, where the base layer features are subject to CV processing via the multiple layers of the network. As FIG. 14 shows, the base layer features are extracted from the reconstructed feature data 1160 corresponding to the feature tensor of the latent space. After processing through the latent-space transform neural network 180 and subsequent CV back-end network 190, a CV output 192 is provided and includes, for example, an numerated list of object items such as lion, elephant, or giraffe.

In another implementation example, the reconstructing of the picture includes processing the combined features by one or more network layers of a second trained (sub)network 150 (e.g. shown in FIG. 13, or in FIG. 14 as system decoder 1170) different from the first trained subnetwork.

Similar to the first trained subnetwork, the second trained (sub)network may be a network based on machine-learning, including NN, CNN, FCNN, etc. similar to the trained network of the encoder side. This is illustrated in FIG. 12 showing an implementation example of the second trained network, including multiple upsampling convolutional layers and inverse GDN (IGDN) layers in-between. As shown, reconstructed feature data 1160, i.e. the feature tensor of the latent space, is input to the second trained (sub)network for human-vision processing so as to provide as output reconstructed picture 152. Since enhancement layer features are used over and above the base layer features, the original input picture may be reconstructed and hence made accessible for human-vision to view true objects lion, elephant, and giraffe.

FIG. 1 shows that reconstructed enhancement feature data 142 and reconstructed base feature data 172 are input to decoder neural network 150. In other words, the whole feature tensor of the latent space is used by decoder NN 150 to reconstruct the input picture 152. As FIG. 1 shows, decoder NN 150 is distinct from the latent-space transform NN 180 which processes only the base layer features for CV tasks. Hence, neural networks 150 and 180 process their respective input feature data independently, and therefore may be viewed as separate networks.

Decoder neural network 150 is an example of the second trained subnetwork.

The reconstructed picture 152 may be post-processed, e.g. by color format conversion (e.g. from YCbCr to RGB), color correction, trimming, or re-sampling, or any other processing, e.g. for preparing the picture for display, e.g. by a display device. The display device may display the picture, e.g. to a user or viewer. The display device may be or comprise any kind of display for representing the reconstructed picture 152 or its post-processed version, e.g. an integrated or external display or monitor. The displays may, e.g. comprise cathode ray tubes (CRT), liquid crystal displays (LCD), plasma displays, organic light emitting diodes (OLED) displays or any other kind of display, such as projector, beamer, hologram (3D), or the like.

Although FIG. 1 depicts the encoder system 100 and the decoder systems 130 and 160 as separate devices, embodiments of devices may also comprise both or both functionalities, the encoder system 100 or corresponding functionality and the decoder systems 130 and/or 160 or corresponding functionality. In such embodiments the encoder system 100 or corresponding functionality and the decoder systems 130 and 160 or corresponding functionality may be implemented using the same hardware and/or software or by separate hardware and/or software or any combination thereof.

As will be apparent to those skilled in the art based on the description, the existence and (exact) split of functionalities of the different units or functionalities within the encoder system 100 and/or decoder systems 130 and/or 160 as shown in FIG. 1 may vary depending on the actual device and application.

Therefore, the encoder system 100 and the decoder systems 130 and/or 160 as shown in FIG. 1 are just example embodiments of the invention and embodiments of the invention are not limited to those shown in FIG. 1.

Encoder system 100 and decoder systems 130 and/or 160 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

Generating Enhancement Features in the Sample Domain

In the embodiments discussed above, the trained network at the encoding side generated features of the latent space, including both base layer features and enhancement layer features as output of the trained network. The features were then split into separate feature data, corresponding to base layer features and enhancement layer features.

According to an embodiment of the present disclosure, the processing circuitry is configured to generate the enhancement layer features by: reconstructing a base layer picture based on the base layer features; and determining the enhancement layer features based on the input picture and the base layer picture.

The base layer picture includes one or more samples (or pixels). Accordingly, the reconstruction of the base layer picture is performed in sample domain.

Figure 2:
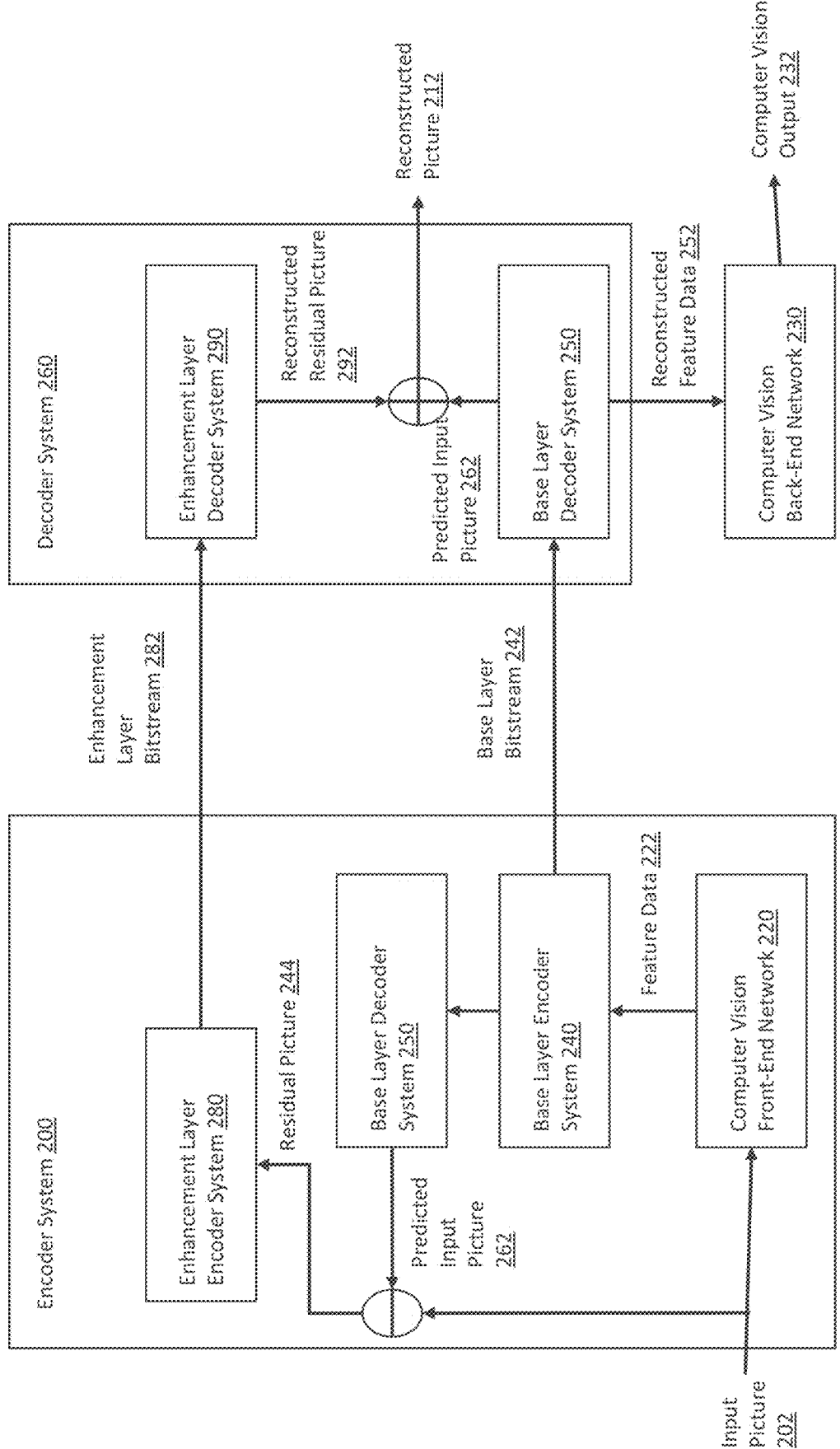
FIG. 2 is a block diagram showing an example structure of an encoder and a decoder configured to implement another embodiment of the invention.

FIG. 2 is a schematic block diagram illustrating this embodiment of a scalable coding system, wherein the coding system comprises an encoder system 200 configured to provide base layer bitstream 242 and enhancement layer bitstream 282. The base layer bitstream 242 can be decoded by the base layer decoder system 250, and the enhancement layer bitstream 282 can be decoded by the enhancement layer decoder system 290.

Similar to the embodiments discussed above, the input picture 202 may be also produced, for example by a camera for capturing a picture, or read from a memory, e.g. a picture memory, comprising or storing a previously captured or generated picture, and/or any kind of interface (internal or external) to obtain or receive a picture. All descriptions related to input picture 102 in FIG. 1, including its characteristics and pre-processing, are applicable to input picture 202 as well.

The encoder system 200 is configured to receive the input picture 202, optionally preprocessed, and provide base layer bitstream 242 and enhancement layer bitstream 282.

These bitstreams may be transmitted to another device, e.g. the destination device or any other device, for storage or direct reconstruction, or to process the base layer bitstream 242 and/or the enhancement layer bitstream 282 for respectively before storing the encoded bitstreams and/or transmitting the encoded bitstreams to another device, e.g. the destination device or any other device for decoding or storing. All the previously mentioned descriptions of destination devices and communication interfaces related to the embodiment in FIG. 1, including their characteristics and the nature of their operation, are applicable to the embodiment shown in FIG. 2 as well.

FIG. 2 shows that the enhancement layer bitstream is no longer based on the whole latent space features generated by processing the input picture via a trained network as is the case in the embodiments discussed above. Rather, the input picture 202 is processed via a computer vision front-end. Network 220, which corresponds to the encoder neural network 110 (trained network) of encoder system 100 of FIG. 1, and provides only base layer features. As before, the base layer features are encoded in a base layer bitstream 242 as FIG. 2 shows. At the encoder side, the base layer features are decoded by base layer decoder 250, and used to reconstruct a base layer picture, corresponding to predicted input picture 262 in FIG. 2. Both the input picture 202 and the base layer picture are used to determine enhancement layer features, which are then encoded in an enhancement layer bitstream 282.

In one exemplary implementation, the determining of the enhancement layer features is based on differences between the input picture and the base picture. For example, the enhancement layer features may be the differences between the input picture 202 and the predicted input picture 262 (i.e. the base layer picture) as FIG. 2 shows. In other words, the enhancement layer features are residual picture 244. As a result, base layer features and EL-features may be encoded efficiently. The differences may be further processed to obtain the EL-features, e.g. the differences may be further encoded using a trained module (e.g. one or more layers of an NN) to further increase the efficiency. Thus, the enhancement features are not necessarily the differences themselves in some exemplary implementations. Even if the enhancement layer features are the differences, they may be still (further) encoded (compressed), using any classical residual encoding approaches such as known image/video codecs.

The decoder system 260 is configured to receive the base layer bitstream 242 and the enhancement layer bitstream 282 and provide reconstructed feature data 252 and optionally a reconstructed picture 212.

In one example implementation, the reconstructing of the picture includes: reconstructing a base layer picture based on the base layer features; and adding the enhancement layer features to the base layer picture.

Figure 3:
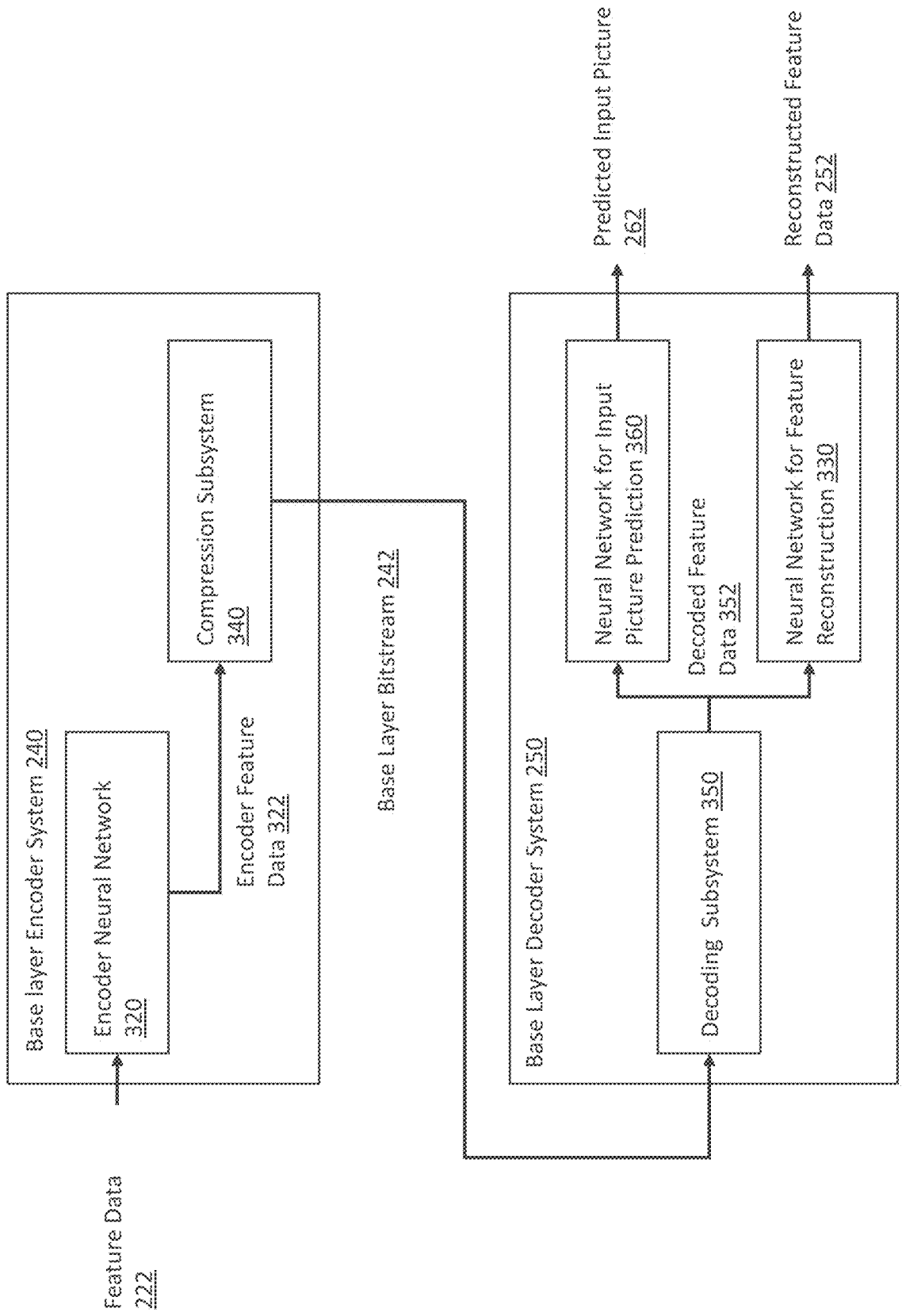
FIG. 3 is a block diagram showing a more detailed structure of the base layer encoder and decoder in one embodiment of the invention.

FIG. 2 further details the respective processing, where decoder system 260 takes base layer bitstream 242 and enhancement layer bitstream 282 as input. As mentioned before, the respective features are encoded in these separate bitstreams. Moreover, the CV processing is performed as already discussed in that the base layer features area decoded via base layer decoder system 250 from the base layer bitstream to reconstruct the base layer features. The base layer features are input to a back-end network. The reconstruction of the base layer features is a predicted input picture 262. Predicted input picture 262 corresponds to the base layer picture. The prediction of the base layer picture is performed in sample domain. The predicted input picture is added to the enhancement layer features, reconstructed from the enhancement layer bitstream. FIG. 3 shows an example implementation of base layer decoder system 250, where base layer features are reconstructed via a neural network 330.

According to an example, the enhancement layer features are based on differences between an encoder-side input picture and the base layer picture. In other words, the enhancement layer features are based on the residuals. Accordingly, the picture may be reconstructed efficiently. Specifically, FIG. 2 shows that the enhancement layer features are reconstructed residual picture 292 to which the predicted input picture 262 is added.

The reconstructed picture 212 may be post-processed, e.g. by color format conversion (e.g. from YCbCr to RGB), color correction, trimming, or re-sampling, or any other processing, e.g. for preparing the picture for display, e.g. by a display device. All the previously mentioned post-processing and uses related to reconstructed picture 152 are applicable to the reconstructed picture 212 as well.

For example, the reconstructed picture is a frame of a video, and the base layer features and the enhancement layer features are for a plurality of frames of the video. Moreover, the processing circuitry is further configured to de-multiplex the base layer features and the enhancement layer features from a bitstream (e.g. a multiplexed bitstream comprising the base layer bitstream and the enhancement layer bitstream) per frame. However, as described above, it is conceivable to provide, to a decoder only a bitstream including a base layer feature bitstream, if the decoder performs only machine vision tasks.

Although FIG. 2 depicts the encoder system 200 and the decoder system 260 as separate devices, embodiments of devices may also comprise both or both functionalities, the encoder system 200 or corresponding functionality and the decoder system 260 or corresponding functionality. In such embodiments the encoder system 200 or corresponding functionality and the decoder system 260 or corresponding functionality may be implemented using the same hardware and/or software or by separate hardware and/or software or any combination thereof.

As will be apparent to those skilled in the art based on the description, the existence and (exact) split of functionalities of the different units or functionalities within the encoder system 200 and/or decoder system 260 as shown in FIG. 2 may vary depending on the actual device and application.

Therefore, the encoder system 200 and the decoder system 260 as shown in FIG. 2 are just example embodiments of the invention and embodiments of the invention are not limited to those shown in FIG. 2.

Encoder system 200 and decoder system 260 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

In particular, the reconstruction of the picture by exploiting the enhancement layer features may employ HEVC/VVC codecs, e.g. for decoding the enhancement features, e.g. when the enhancement features are differences (residuals).

SOME EMBODIMENTS OF ENCODERS AND ENCODING METHODS

The encoder system 100 in FIG. 1 comprises the encoder neural network 110 and the compression subsystem 120. The encoder neural network 110 of FIG. 1 is an example of a trained network. The encoder system 100 is configured to receive an input picture 102, which may be optionally pre-processed as described earlier, and produce base feature bitstream 122 and enhancement feature bitstream 124. The input picture 102 may also be referred to as current picture or picture to be coded (in particular in video coding to distinguish the current picture from other pictures, e.g. previously encoded and/or decoded pictures of the same video sequence, i.e. the video sequence which also comprises the current picture).

The encoder neural network 110 is configured to receive the input picture 102, which may be optionally preprocessed as described earlier, and process the input picture to produce a set of features, also referred to as feature tensor or latent-space data. The feature tensor of the latent space, i.e. the features of the latent space, may include base layer features and enhancement layer features. The base layer features and enhancement layer features may be also referred to as base feature data and enhancement feature data, respectively.

In particular, the encoder neural network 110 produces two sets of features: base feature data 112 and enhancement feature data 114. In an exemplary embodiment, these sets of features may represent latent-space tensor channels. Together, base feature data and enhancement feature data provide enough information to reconstruct the input picture. Examples of neural networks whose latent-space feature data contains enough information to reconstruct the input picture include network with GDN layers. However, such networks cannot be used directly in the encoder system 100; they need to be re-trained such that features relevant to computer vision processing are steered into a subset of the latent-space features (namely, base feature data 112) while other features that are not relevant to computer vision processing are steered to the remainder of the latent space (namely, enhancement feature data 114).

FIG. 9 depicts an example of an input picture 102 and the corresponding base feature data 112, where the base feature data comprises a subset of the channels of the latent-space feature tensor, and the channels are tiled into an image for illustration. Some features may bear resemblance to the input picture 102, but they are perceptually quite different from the input picture, so they do not provide sufficiently accurate input picture reconstruction. Their purpose is to support a computer vision processing task, such as image classification, person or object detection, depth or distance estimation, object tracking, object segmentation, semantic segmentation, instance segmentation, facial feature extraction, face recognition, person identification, action recognition, anomaly detection, and so on. In other embodiments, base feature data may be composed of other subsets of latent-space tensor elements.

The compression subsystem 120 receives these base feature data 112 and enhancement feature data 114 as individual inputs, then using an entropy encoder codes the base feature data 112 and enhancement feature data 114 to generate base feature bitstream 122 and enhancement feature bitstream 124. The compression subsystem 120 may also incorporate any and all of the following processing blocks typically found in compression systems, such as scaling, clipping, spatial and/or temporal prediction, transform, scalar quantization, and vector quantization, used as is known to those skilled in the art. The entropy encoder may be configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC) or a neural network-based entropy coding) on its input data and produce the base feature bitstream 122 and enhancement feature bitstream 124.

The encoder system 200 in FIG. 2 comprises a computer vision processing front-end network 220, a base layer encoder system 240, a base layer decoder system 250, and an enhancement layer encoder system 280. The encoder system 200 is configured to receive an input picture 202, which may be optionally pre-processed as described earlier, and produce base layer bitstream 242 and enhancement layer bitstream 282. The input picture 202 may also be referred to as current picture or picture to be coded (in particular in video coding to distinguish the current picture from other pictures, e.g. previously encoded and/or decoded pictures of the same video sequence, i.e. the video sequence which also comprises the current picture).

The computer vision front-end network 220 is configured to receive the input picture 202, which may be optionally preprocessed as described earlier, and process the input picture to produce a set of features, also referred to as feature tensor or latent space data, shown as feature data 222 in FIG. 2. The term "computer vision front-end network" means that this is a portion of a larger computer vision processing network that has been trained to produce a computer vision processing output, such as object class labels, object bounding boxes, and so on, depending on the computer vision task. Examples of such networks (existing frameworks) include visual geometric group (VGG) as detailed in "VERY DEEP CONVOLUTIONAL NETWORKS FOR LARGE-SCALE IMAGE RECOGNITION" by K. Simonyan et al., residual (neural) networks ResNet as discussed in "Deep Residual Learning for Image Recognition" by K. He et al., You-Only-Look-Once (YOLO) discussed by J. Redmon in "You Only Look Once: Unified, Real-Time Object Detection", Single Shot Detector (SSD) detailed by W. Liu in "SSD: Single Shot MultiBox Detector", U-Net discussed by O. Ronneberger in "U-Net: Convolutional Networks for Biomedical Image Segmentation" and many other computer vision networks, as known in the art. The front end of such a network is configured to receive the input picture 202 and produce intermediate latent-space feature data 222. Such feature data 222 can then be fed to the back end of the said larger computer vision processing network to produce the computer vision processing output. The back end of the larger computer vision processing network will be discussed later in the context of the decoder.

FIG. 10 depicts an example of an input picture 202 and the corresponding latent-space feature data 222, where the latent-space feature tensor channels are tiled into an image for illustration. Some features may bear resemblance to the input picture 202, but they are perceptually quite different from the input picture, so they do not provide sufficiently accurate input picture reconstruction. Their purpose is to support a computer vision task, such as image classification, person or object detection, depth or distance estimation, object tracking, object segmentation, semantic segmentation, instance segmentation, facial feature extraction, face recognition, person identification, action recognition, anomaly detection, and so on. The base layer encoder system 240 is configured to receive (latent-space) feature data 222 and produce base layer bitstream 242.

FIG. 3 shows a more detailed schematic of the base layer encoder system 240. Within the base layer encoder system 240 in FIG. 3, the encoder neural network 320 is configured to receive (latent-space) feature data 222 and produce encoder feature data 322. The compression subsystem 340 is configured to receive encoder feature data 322 and produce the base layer bitstream 242. The compression subsystem 340 incorporates an entropy encoder, and may also incorporate any and all of the following processing blocks typically found in compression systems, such as scaling, clipping, spatial and/or temporal prediction, transform, scalar quantization, and vector quantization, used as is known to those skilled in the art. The entropy encoder may be configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC) or a neural network-based entropy coding) on its input data and produce the base layer bitstream 242.

In the encoder system 200 in FIG. 2, base layer decoder system 250 is configured to receive the base layer bitstream 242 and produce the predicted input picture 262. A more detailed schematic of the base layer decoder system 250 is shown in FIG. 3.

The base layer decoder system 250 in FIG. 3 is configured to receive the base layer bitstream 242 and produce reconstructed feature data 252 and predicted input picture 262. In different embodiments, only one, or both, of these outputs may be needed. For example, the base layer decoder system 250 could be configured to produce only the predicted input picture 262, as is the case in the encoder system 200 in FIG. 2. In another embodiment, the base layer decoder system 250 could be configured to produce only the reconstructed feature data 252. The example embodiment in FIG. 3 of the base layer decoder system 250 is merely an illustration that the system has the capability to produce two outputs, without implying that both outputs will be produced or are needed in all cases.

Within the base layer decoder system 250 in FIG. 3, the decoding subsystem 350 is configured to receive the base layer bitstream 242 and produce decoded feature data 352. The neural network for feature reconstruction 330 is configured to receive decoded feature data 352 and produce reconstructed (latent-space) feature data 252. In a lossless coding system, the reconstructed (latent-space) feature data 252 would be equal to the feature data 222 in FIG. 2. In a lossy coding system, reconstructed (latent-space) feature data 252 is an approximation of the (latent-space) feature data 222. The neural network for input picture prediction 360 is configured to receive decoded feature data 352 and produce predicted input picture 262, which is an approximation of the input picture 202 in FIG. 2.

In the encoder system 200 in FIG. 2, the predicted input picture 262 is subtracted from the actual input picture 202, and the difference is referred to as residual picture 244. The enhancement layer encoder system 280 is configured to receive the residual picture 244 and produce the enhancement layer bitstream 282. The enhancement layer encoder system 280 comprises an entropy encoder, and may also incorporate any and all of the following processing blocks typically found in compression systems, such as scaling, clipping, spatial and/or temporal prediction, scalar quantization, and vector quantization, used as is known to those skilled in the art. The entropy encoder may be configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC) or a neural network-based entropy coding) on its input data and produce the enhancement layer bitstream 282.

In an exemplary implementation, the processing circuitry is further configured to encrypt a portion of a bitstream including the enhancement layer features. Accordingly, the picture reconstruction may be prohibited and the human-vision processing may be protected from unauthorized viewers (users). The encryption of a portion of a bitstream may include encrypting the whole enhancement layer. Alternatively, one or more parts of the enhancement layer (i.e. one or more portions) may be encrypted.

Exemplary Embodiments of Decoders and Decoding Methods

FIG. 1 depicts two decoders: base feature decoder system 160 and enhancement feature decoder system 130. Although FIG. 1 depicts the base feature decoder system 160 and the enhancement feature decoder system 130 as separate devices, embodiments of devices may also comprise both or both functionalities, the base feature decoder system 160 or corresponding functionality and the enhancement feature decoder system 130 or corresponding functionality. In such embodiments, the base feature decoder system 160 or corresponding functionality and the enhancement feature decoder system 130 or corresponding functionality may be implemented using the same hardware and/or software or by separate hardware and/or software or any combination thereof.

The base feature decoder system 160 is configured to receive the base feature bitstream 122 and produce two outputs: reconstructed base feature data 172 and transformed feature data 182. The base feature decoder system 160 comprises base feature reconstruction subsystem 170 and latent space transform neural network 180. The base feature reconstruction subsystem 170 is configured to receive the base feature bitstream 122 and produce reconstructed base feature data 172. In a lossless coding system, the reconstructed base feature data 172 would be equal to the base feature data 112. In a lossy coding system, reconstructed base feature data 172 is an approximation of the base feature data 112. The base feature reconstruction subsystem 170 contains an entropy decoder (the counterpart of the entropy encoder in the compression subsystem 120) and may optionally contain counterparts of other processing blocks that may be used in the compression subsystem 120 (such as scaling, clipping, spatial and/or temporal prediction, transform, scalar quantization, and vector quantization), used as is known to those skilled in the art.

The latent space transform neural network 180 is configured to receive reconstructed base feature data 172 and produce transformed feature data 182. The transformed feature data 182 is used as input to the computer vision processing back-end network 190, which performs computer vision processing and produces computer vision processing output 192, which may consist of object class labels, object bounding boxes, facial landmarks, or other outputs depending on the computer vision task. In an exemplary embodiment, transformed feature data 182 may be feed into an intermediate layer of a given pre-trained computer vision processing network (such as, for example, VGG, ResNet, YOLO, SSD, U-Net, and so on), and the section of the said pre-trained network from the point at which the transformed feature data 182 are introduced up to the output of the said pre-trained network is referred to as the "computer vision back-end network" 190. In such an embodiment, the latent space transform neural network 180 would be trained and configured to approximate the features at the said intermediate layer of the pre-trained network from the reconstructed base feature data 172.

The enhancement feature decoder system 130 is configured to receive the enhancement feature bitstream 124 and reconstructed base feature data 172, and to produce the reconstructed picture 152. In a lossless coding system, the reconstructed picture 152 would be equal to the input picture 102. In a lossy coding system, the reconstructed picture 152 is an approximation of the input picture 102.

The enhancement feature decoder system 130 comprises the enhancement feature reconstruction subsystem 140 and the decoder neural network 150. The enhancement feature reconstruction subsystem 140 is configured to receive the enhancement feature bitstream 124 and produce the reconstructed enhancement feature data 142. In a lossless coding system, the reconstructed enhancement feature data 142 would be equal to the enhancement feature data 114. In a lossy coding system, the reconstructed enhancement feature data 142 is an approximation of the enhancement feature data 114. The enhancement feature reconstruction subsystem 140 contains an entropy decoder (the counterpart of the entropy encoder in the compression subsystem 120) and may optionally contain counterparts of other processing blocks that may be used in the compression subsystem 120 (such as scaling, clipping, spatial and/or temporal prediction, transform, scalar quantization, and vector quantization), used as is known to those skilled in the art.

The decoder neural network 150 is configured to receive the reconstructed enhancement feature data 142 and the reconstructed base feature data 172, and to produce the reconstructed picture 152. As mentioned earlier, in a lossy coding system, the reconstructed picture 152 is an approximation of the input picture 102. The decoder neural network 150 may be trained and configured to minimize an approximation error (the difference between the input picture 102 and the reconstructed picture 152) measured by, for example mean squared error (MSE), mean absolute error (MAE), or another error metric. Alternatively, the decoder neural network 150 may be trained and configured to maximize the perceptual quality of the reconstructed picture 152 relative to the input picture 102, as measured by structural similarity index measure (SSIM) or another perceptual metric.

FIG. 2 depicts decoder system 260, which comprises base layer decoder system 250 and enhancement layer decoder system 290. The decoder system 260 is configured to receive the base layer bitstream 242 and the enhancement layer bitstream 282, and to produce the reconstructed feature data 252 and the reconstructed picture 212. In a lossless coding system, the reconstructed (latent-space) feature data 252 would be equal to the (latent-space) feature data 222, and the reconstructed picture 212 would be equal to the input picture 202. In a lossy coding system, the reconstructed (latent-space) feature data 252 is an approximation of the (latent-space) feature data 222 and the reconstructed picture 212 is an approximation of the input picture 202.

FIG. 3 illustrates the base layer decoder system 250 in greater detail. It is configured to receive the base layer bitstream 242 and produce reconstructed (latent-space) feature data 252 and predicted input picture 262. In different embodiments, only one, or both, of these outputs may be needed. For example, the base layer decoder system 250 could be configured to produce only the predicted input picture 262, as is the case in the encoder system 200 in FIG. 2. In another embodiment, the base layer decoder system 250 could be configured to produce only the reconstructed feature data 252. The example embodiment in FIG. 3 of the base layer decoder system 250 is merely an illustration that the system has the capability to produce two outputs, without implying that both outputs will be produced or are needed in all cases.

The base layer decoder system 250 in FIG. 3 comprises the decoding subsystem 350, the neural network for feature reconstruction 330 and the neural network for input picture prediction 360. The decoding subsystem 350 is configured to receive the base layer bitstream 242 and produce decoded feature data 352. The decoding subsystem 350 contains an entropy decoder (the counterpart of the entropy encoder in the compression subsystem 340) and may optionally contain counterparts of other processing blocks that may be used in the compression subsystem 340 (such as scaling, clipping, spatial and/or temporal prediction, transform, scalar quantization, and vector quantization), used as is known to those skilled in the art.

The neural network for feature reconstruction 330 is configured to receive decoded feature data 352 and produce reconstructed (latent-space) feature data 252. In a lossless coding system, the reconstructed (latent-space) feature data 252 would be equal to the (latent-space) feature data 222 in FIG. 2. In a lossy coding system, reconstructed (latent-space) feature data 252 is an approximation of the (latent-space) feature data 222. The neural network for input picture prediction 360 is configured to receive decoded feature data 352 and produce predicted input picture 262, which is an approximation of the input picture 202 in FIG. 2.

The enhancement layer decoder subsystem 290 in FIG. 2 is configured to receive the enhancement layer bitstream 282 and produce the reconstructed residual picture 292. In a lossless coding system, the reconstructed residual picture 292 would be equal to the residual picture 244. In a lossy coding system, reconstructed residual picture 292 is an approximation of the residual picture 244. The enhancement layer decoder subsystem 290 contains an entropy decoder (the counterpart of the entropy encoder in the enhancement layer encoder system 280) and may optionally contain counterparts of other processing blocks that may be used in the enhancement layer encoder system 280 (such as scaling, clipping, spatial and/or temporal prediction, transform, scalar quantization, and vector quantization), used as is known to those skilled in the art.

The reconstructed residual picture 292 is added to the predicted input picture 262 to produce the reconstructed picture 212. The reconstructed picture 212 may be subject to post-processing, as described earlier.

The above descriptions show how the video and image features are encoded into a base feature (layer) bitstream 122 (242) and enhancement feature (layer) bitstream 142 (282), and how these bitstreams are decoded. In practice, the two bitstreams and possibly associated information related to video frame index or other parameters are packed into a suitable format. As explained before, the base feature (layer) bitstream is combined with the enhancement feature (layer) bitstream in a multiplex fashion into an output bitstream, which can be de-multiplexed at the decoder side.

According to an implementation example, the processing circuitry is further configured to decrypt a portion of a bitstream including the enhancement layer features. The decryption of a portion of a bitstream may include decrypting the whole enhancement layer. Alternatively, one or more parts of the enhancement layer (i.e. one or more portions) may be decrypted. Accordingly, the portion of the bitstream entailing the enhancement layer features are accessible only by decryption. Hence, the input picture may be only reconstructed and hence made available for human-vision processing after decryption by authorized users. As a result, the privacy of human-vision processing is provided.

FIG. 4 shows an exemplary embodiment of the syntax of the data containers 400 and 410, for the base layer and enhancement layer data, respectively.

An exemplary embodiment of the syntax of the data container 400 includes the base feature (layer) bitstream 406, encoded by the compression subsystem 120 in the encoder system 100, or the base layer encoder system 240 in the encoder system 200. In the case of two layers, as discussed in the exemplary embodiments, one bit is used to identify the layer index (L=0 for base layer). If there are more than two layers, several bits can be assigned to parameter L. Coded base data header 404 includes dimension or resolution information associated with the coded base feature (layer) data, and may also include information related to the computer vision task or the neural network for the computer vision task 190 (230). With these parameters the decoder can correctly interpret the decoded fixed point feature values and reconstruct the floating point values. Of course, other image feature information, such as the dimension of the feature tensor, the number of features, and locations of features in the video or frame may also be added to the coded base data header 404. The coded data may include an additional parameter to indicate the type of the feature.

An exemplary embodiment of the syntax of the data container 410 includes the enhancement feature (layer) bitstream 418, encoded by the compression subsystem 120 in the encoder system 100, or the enhancement layer encoder system 280 in the encoder system 200. In the case of two layers, as discussed in the exemplary embodiments, one bit is used to identify the layer index (L=1 for enhancement layer). If there are more than two layers, several bits can be assigned to parameter L. Also, one bit (m) is used to signal the coding mode (m=1 for concatenation coding, m=0 for differential coding). Coded enhancement data header 414 includes dimension or resolution information associated with the coded enhancement feature (layer) data, and may also include information related to input picture reconstruction for human viewing, such as bit depth, any range or scale information associated with the original input picture, region of interest, etc. With these parameters {L, m}, and coded enhancement data header 414, the decoder can correctly interpret the decoded fixed point enhancement feature (layer) values and reconstruct the floating point values. Further embodiments of the syntax of the data container may not use (not comprise) coding mode (m), e.g., in case the mode is predetermined or does not change (i.e. is fixed), e.g., for a whole sequence of video pictures, a whole video or in general, e.g. by stream configuration.

To make use of standard video stream architectures, data containers 400 and 410 may be encapsulated into a standard video stream, such as H.264, H.265, or H.266. In such cases, supplemental enhancement information (SEI) may be used for additional information regarding the base and/or enhancement bitstreams.

When more than one feature are extracted from a video frame, all extracted image features related to that frame are put together into a single data container. If a standard video stream is used, this information can be added to the SEI header of the video frame in the video bitstream. In this manner, the features in the enhancement layer are synchronized with the video stream. In other words, the features pertaining to a frame and the enhancement information pertaining to a frame are associated.

The following exemplary embodiments show vision systems in which the primary goal is to accomplish computer vision (CV) processing (CV analysis), while input picture reconstruction is needed less frequently. Examples of where such systems are needed in practice include video monitoring, surveillance, and autonomous driving. By providing CV processing-related information in the base feature (layer) bitstream, these exemplary embodiments are able to accomplish CV processing (CV analysis) more efficiently, without input picture reconstruction.

FIG. 5 shows an exemplary embodiment of the present disclosure based on the codec from FIG. 1, where CV processing/analysis based on base feature information runs continuously, while input picture reconstruction is enabled only when requested. The CV analyzer 500 is configured to receive the base feature bitstream 122, decode it using the base feature decoder system 160, and produce transformed feature data 180 for CV processing (CV analysis). Examples of CV processing (CV analysis) shown in FIG. 5 are face recognition 540 and object detection 550, but other CV processing (CV analysis) can be supported with appropriate features (i.e. using an appropriately trained latent space transform neural network 180 in FIG. 1). The CV analyzer 500 also provides base feature storage 520 and base feature retrieval 530 for the reconstructed base feature data 172.

Enhancement feature bitstream 124 produced by the encoder system 100 is stored in the enhancement feature bitstream storage 510. When input picture reconstruction is needed, access request signal 511 is sent by the CV analyzer (alternatively, the same signal can be sent by a human operator). This will cause the enhancement feature bitstream 124 from the enhancement feature bitstream storage 510 and the reconstructed base feature data 172 from the base feature storage 520 to be moved to the enhancement feature decoder system 130 and decoded as described earlier. As a result, the reconstructed picture 152 will be produced.

Figure 6:
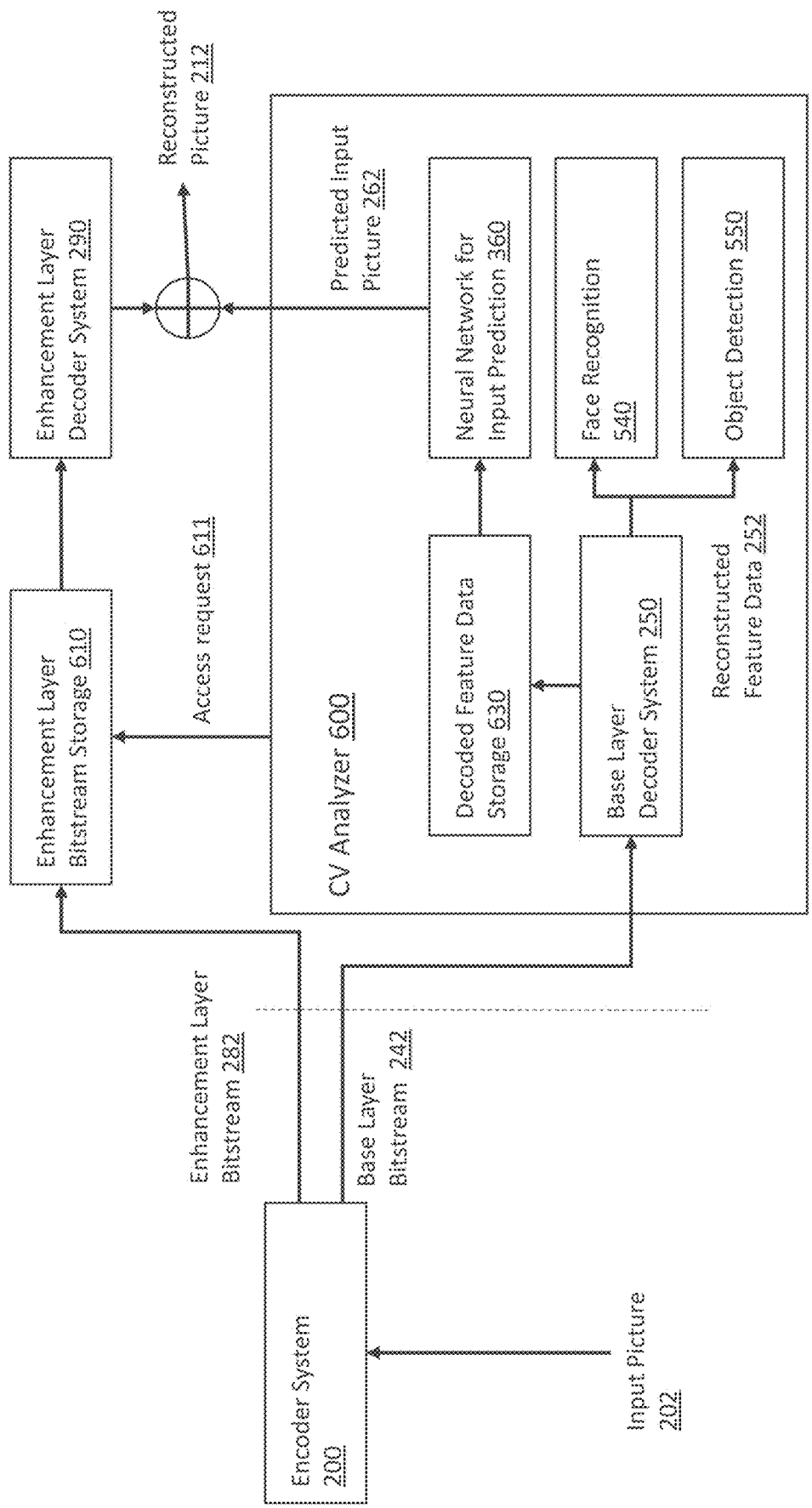
FIG. 6 is a block diagram of another computer vision processing system, including a scalable feature and video encoder and decoder, performing computer vision analysis of a video based on image features in the base layer bitstream and optionally reconstructing video using enhancement information in the enhancement layer bitstream.

FIG. 6 shows an exemplary embodiment of the present disclosure based on the codec from FIG. 2, where CV analysis based on base feature information runs continuously, while input picture reconstruction is enabled only when requested. The CV analyzer 600 is configured to receive the base layer bitstream 242, decode it using the base feature decoder system 250, and produce reconstructed feature data 252 for CV analysis (CV processing). Examples of CV analysis (CV processing) shown in FIG. 6 are face recognition 540 and object detection 550, but other CV analysis (CV processing) can be supported with appropriate features (i.e. using an appropriate computer vision front-end network 220 in FIG. 2). The CV analyzer 600 also provides decoded feature data storage 630, where decoded feature data 352 from FIG. 3 are stored.

Enhancement layer bitstream 282 produced by the encoder system 200 is stored in the enhancement layer bitstream storage 610. When input picture reconstruction is needed, access request signal 611 is sent by the CV analyzer (alternatively, the same signal can be sent by a human operator). This will cause the enhancement layer bitstream 282 to be moved from the enhancement layer bitstream storage 610 to the enhancement layer decoder system 290 and decoded as described earlier to produce enhancement information. The same access request signal will cause decoded feature data from the decoded feature data storage 630 to be sent to the neural network for input prediction 360, which will produce predicted input picture 262. When the enhancement information is added to the predicted input picture 262, the reconstructed picture 212 will be produced.

Compared to the embodiment shown in FIG. 5, the advantage of the embodiment of FIG. 6 is that a predicted input picture 262 is available directly from the CV analyzer 600 without conducting the enhancement layer decoding. This can reduce the computational complexity for producing an approximation to the input picture. However, a picture of better quality (specifically, the reconstructed picture 212) can be obtained once the enhancement layer bitstream 282 is decoded and the enhancement information is added to the predicted input picture 262.

Figure 11:
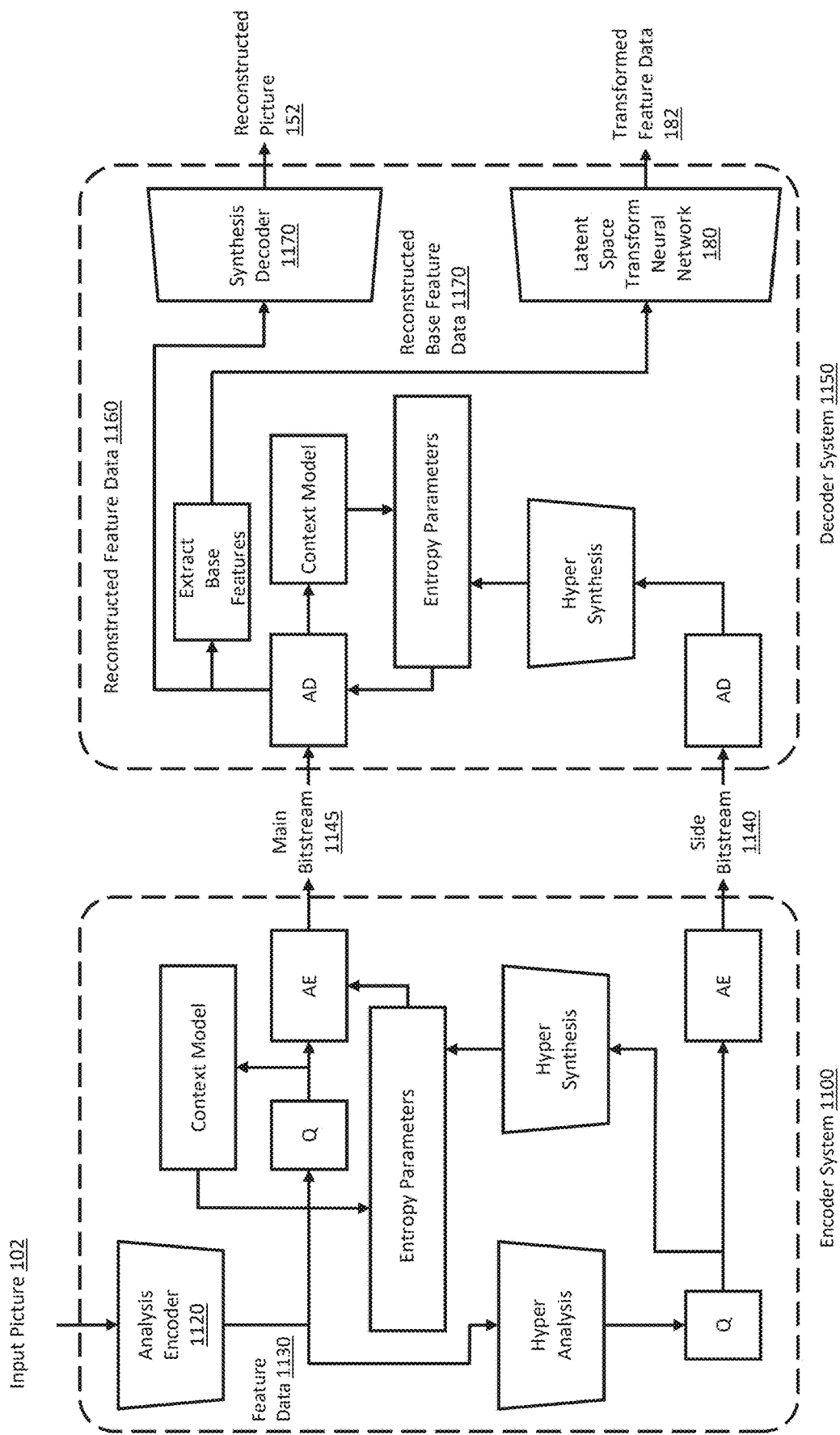
FIG. 11 is a block diagram of an encoder-decoder framework supporting CV-HV multi-task with latent-space scalability.

FIG. 11 shows an exemplary embodiment of the present disclosure suitable for collaborative intelligence, based on the codec from FIG. 1. The encoder system 1100 is configured to receive the input picture 102 and produce two bitstreams: side bitstream 1140 and main bitstream 1145. In this embodiment, both the side bitstream and the main bitstream encode both base features and enhancement features (i.e., base and enhancement features are not separated at the bitstream level). The input picture 102 is processed by the analysis encoder 1120 (to be described in more detail below), which produces latent-space feature data 1130. Latent-space feature data 1130 is composed of base feature data and enhancement feature data, but base and enhancement feature data are not encoded into separate bitstreams in this embodiment. Latent-space feature data 1130 is processed via hyper analysis to produce hyper parameters, which are quantized (Q) and encoded using arithmetic encoder (AE) into the side bitstream 1140. In this context, "hyper parameters" are parameters used to increase the efficiency of entropy coding. The hyper parameters are used to compute entropy parameters, which are used in arithmetic encoding (AE) of the latent-space feature data 1130 to produce the main bitstream 1145.

The decoder system 1150 in FIG. 11 is configured to receive the side bitstream 1140 and the main bitstream 1145, and produce transformed feature data 182 and, optionally, reconstructed picture 152. The side bitstream 1140 is arithmetically decoded (AD) to reconstruct hyper parameters, which are then processed to compute entropy parameters. The entropy parameters are used in arithmetic decoding (AD) of latent-space feature data, to obtain reconstructed feature data 1160. A subset of reconstructed feature data 1160 is then extracted to produce reconstructed base feature data 1170. The reconstructed base feature data is fed to the latent space transform neural network 180 to produce transformed feature data 182 for computer vision processing task. Optionally, the entire reconstructed feature data 1160 can be decoded by the synthesis decoder 1170 to produce the reconstructed picture 152.

FIG. 12 shows a more detailed illustration of the analysis encoder 1120 for the case where the input picture 102 is in the YUV420 format, comprising one luminance component 1203 (Y) and two chrominance components 1204 (U and V). The luminance component 1203 is processed by a convolutional layer (CONV), downsampling ($\downarrow 2$) and generalized divisive normalization (GDN) layer. The chrominance components 1204 are processed by a CONV layer and a GDN layer. Then the processed luminance and chrominance components are concatenated and processed by a sequence of CONV, downsampling and GDN layers to produce feature data 1130.

FIG. 13 shows a more detailed illustration of the synthesis decoder 1170 for the case where the input picture 102 is in the YUV420 format. In this case, the reconstructed picture will also be in the YUV420 format. Reconstructed feature data 1160 are processed by a sequence of CONV layers, upsampling (↑2), and inverse generalized divisive normalization (IGDN) layers. Then the processed feature data is split into luminance-related feature data and chrominance-related feature data. The luminance-related feature data is processed by a sequence of CONV, upsampling, and IGDN layers to produce the reconstructed luminance component 1303. The chrominance-related feature data is processed by a sequence of CONV, upsampling, and IGDN layers to produce the reconstructed chrominance components 1304. The reconstructed luminance component 1303 and the reconstructed chrominance components 1304 are combined to produce the reconstructed picture 152 in the YUV420 format.

FIG. 14 shows a further example of the embodiment of the present disclosure from FIG. 11, where the CV analysis task is object recognition. Reconstructed base feature data 1170 are extracted from reconstructed feature data 1160 and fed into the latent space transform neural network 180. The latent space transform neural network 180 consists of a sequence of CONV, upsampling, and IGDN layers, and produces transformed feature data 182. The transformed feature data 180 is fed into the computer vision back-end network 190, which produces computer vision output 192. When the CV analysis task is object detection, as in FIG. 14, the computer vision output 192 consists of bounding box coordinates for objects in the input picture, object class labels ("Lion", "Elephant", . . . ), and confidence levels. Optionally, reconstructed feature data 1160 can be fed to the synthesis decoder 1170 to produce the reconstructed picture 152.

In more detail, when looking at FIG. 11, the feature data 1130 may be a feature tensor y, which is encoded into the bitstream, and which includes (separable) the base layer features and the enhancement layer features. They may be quantized/lossy-encoded in the bitstream, so that, in general, the decoder side decodes the reconstructed feature data 1160 corresponding to tensor ŷ. In other words, the reconstructed latent feature tensor ŷ is available by properly decoding the received bitstreams. Some of the latent features ŷ={Y1, Y2, . . . , Yj, Y(j+1), YN} are learned and shared to represent not only for input reconstruction, but also for object feature-related information. Therefore, a subset of the decoded latent ŷ_b={Y1, Y2, . . . , Yj}, where j<N, is used as input to the latent transform block 180 that produces an estimated output tensor 182 of an intermediate layer in a targeted vision task network (180+190). During the network computation with ŷ_b, the remaining latent features {Y(j+1), . . . , YN} are neglected (or, in some embodiments even not received or not decoded from the bitstream). We refer to this computer vision task-related operation as a base layer for machine vision, which is independent from the human vision task as described above. Only if the input reconstruction task is needed, then the latent-space scalability works in by utilizing the entire ŷ as an input to the synthesis decoder 1170 to estimate the input image.

In one embodiment, referring to FIG. 11, analysis encoder 1120 is the GDN analysis network that produces, for each input image 102, a latent feature tensor y with 192 channels (N=192). Synthesis decoder 1170 is the GND synthesis network that reconstructs the input picture using all N=192 tensor channels. A subset of these channels {Y1, Y2, . . . , Yj}, with j=128, is designated as the base layer to support the object detection task, while the entirety of the channels, {Y1, Y2, . . . , Y192}, supports input picture reconstruction. In the decoder system 1150, reconstructed base feature data 1170, ŷ_b={Y1, Y2, . . . , Y128}, are separated from the remaining latent features and passed on to the latent space transform neural network 180 to produce transformed feature data 182. The transformed feature data 182 are fed to the layer 12 of the YOLOv3 object detection neural network. To ensure that the base layer, i.e. the latent space tensor channels {Y1, Y2, . . . , Y128} indeed support object detection, the encoder system 1100 and the decoder system 1150 are trained jointly end-to-end. For this training, the loss function includes at least one term that measures the fidelity of the input picture reconstruction as the reconstructed picture 152 and at least one term that measures the fidelity of the reconstruction of layer 12 YOLOv3 features as the transformed feature data 182.

According to an embodiment of the present disclosure, a method is provided for encoding an input picture. The encoding method is illustrated in FIG. 18 and comprises generating (S1810), for computer vision processing, base layer features of a latent space. The generating of the base layer features includes processing the input picture with one or more base layer network layers of a trained network. Further, the method comprises generating (S1820), based on the input picture, enhancement layer features for reconstructing the input picture. Moreover, the method comprises encoding (S1830) the base layer features into a base layer bitstream and the enhancement layer features into an enhancement layer bitstream.

According to an embodiment of the present disclosure, a method is provided for processing a bitstream. The bitstream processing method is illustrated in FIG. 19 and comprises obtaining (S1910) a base layer bitstream including base layer features of a latent space and an enhancement layer bitstream including enhancement layer features. Further, the method comprises extracting (S1920) from the base layer bitstream the base layer features. Moreover, the method comprises performing at least one out of: computer-vision processing (S1930) based on the base layer features; and extracting (S1940) the enhancement layer features from the enhancement layer bitstream and reconstructing (1942) a picture based on the base layer features and the enhancement layer features.

According to an embodiment of the preset disclosure, provided is a computer-readable non-transitory medium storing a program, including instructions which when executed on one or more processors cause the one or more processors to perform the method according to any of embodiments referred to above.

According to an embodiment of the present disclosure, apparatus is provided for encoding an input picture, the apparatus comprising: one or more processors; and a non-transitory computer-readable storage medium coupled to the one or more processors and storing programming for execution by the one or more processors, wherein the programming, when executed by the one or more processors, configures the encoder to carry out the encoding method.

According to an embodiment of the present disclosure, an apparatus is provided for processing a bitstream, the apparatus comprising: one or more processors; and a non-transitory computer-readable storage medium coupled to the one or more processors and storing programming for execution by the one or more processors, wherein the programming, when executed by the one or more processors, configures the apparatus to carry out the bitstream processing method.

According to an embodiment of the present disclosure, provided is a computer program comprising a program code for performing the method when executed on a computer according to any of embodiments referred to above.

The program may be one program which executes the instructions for encoding and reconstructing the video and associated features sequentially. Alternatively, the program may include a first program for encoding the video and associated features and second program different from the first program for reconstructing the video and associated features.

The embodiments of the invention enable to perform computer vision analysis (CV processing) via computer vision algorithms more efficiently, accurately and reliably, as a result of using high-quality image features. These image features are determined at the terminal side, where the video is taken by a camera and the image feature is extracted from the uncompressed (i.e. undistorted) video as commonly performed. Therefore, typical computer vision tasks, such as object detection and face recognition may be performed with high accuracy.

For such computer vision tasks it is important that one or a plurality of image features are of high quality, in order to achieve a high precision in application such as video surveillance, computer vision feature coding, or autonomous driving, for example.

At the same time, it is important that the extracted high quality image features are encoded (compressed) efficiently to assure that a computer vision task can operate with fewer bits of information. This is accomplished by embodiments of the present invention where features are encoded into a base feature bitstream or base layer bitstream, which requires fewer bits than encoding the input video.

The approach disclosed by the embodiment of the invention may be used and implemented on chips, in surveillance cameras, or other consumer devices with computer vision algorithms based on camera.

Note that this specification provides explanations of pictures (frames), but field substitute as pictures in the case of an interlace picture signal.

Although embodiments of the invention have been primarily described based on video coding, it should be noted that any embodiment as specified in the claims and described in this application not using inter-picture prediction is or may also be configured for still picture feature extraction and still picture processing or coding, i.e. for feature extraction and for the processing or coding based on an individual picture independent of any preceding or consecutive picture(s) as in video coding. The disclosure provided herein with regard to video picture embodiments applies equally to those still picture embodiments. The only difference compared to video feature extraction and video coding is that no inter-picture prediction is used for coding.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments.

The terminology of "units" is merely used for illustrative purposes of the functionality of embodiments of the encoder/decoder and are not intended to liming the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, optical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, the functional units in the embodiments of the invention may be integrated into one processing unit, or each of the units may exist alone physically, or two or more units are integrated into one unit.

Embodiments of the invention may further comprise an apparatus, e.g. encoder and/or decoder, which comprises a processing circuitry configured to perform any of the methods and/or processes described herein.

Embodiments of the invention, e.g. of the encoders 100, 200 and/or decoders 130, 160, 260, may be implemented as hardware, firmware, software or any combination thereof. For example, the functionality of the encoder/encoding or decoder/decoding may be performed by a processing circuitry with or without firmware of software, e.g. a processor, a microcontroller, a digital signal processor (DSP), a field programmable gate array (FPGA), an application-specific integrated circuit (ASIC), or the like.

The functionality of any of the embodiments, e.g. the encoders 100, 200 (and corresponding encoding methods 100, 200) and/or decoders 130, 160, 260 (and corresponding decoding methods 130, 160, 260), may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the invention comprises or is a computer program comprising program code for performing any of the methods described herein, when executed on a computer.

An embodiment of the invention comprises or is a non-transitory computer readable medium comprising a program code that, when executed by a processor, causes a computer system to perform any of the methods described herein.

The embodiments of the present disclosure discussed above entail encoding of enhancement features in a corresponding bitstream and needed to reconstruct the original input picture of the vide on a frame-to-frame basis. The respective picture processing tasks, i.e. the encoding in the enhancement layer (video) and the decoding may be performed by video coding systems.

Figure 20A:
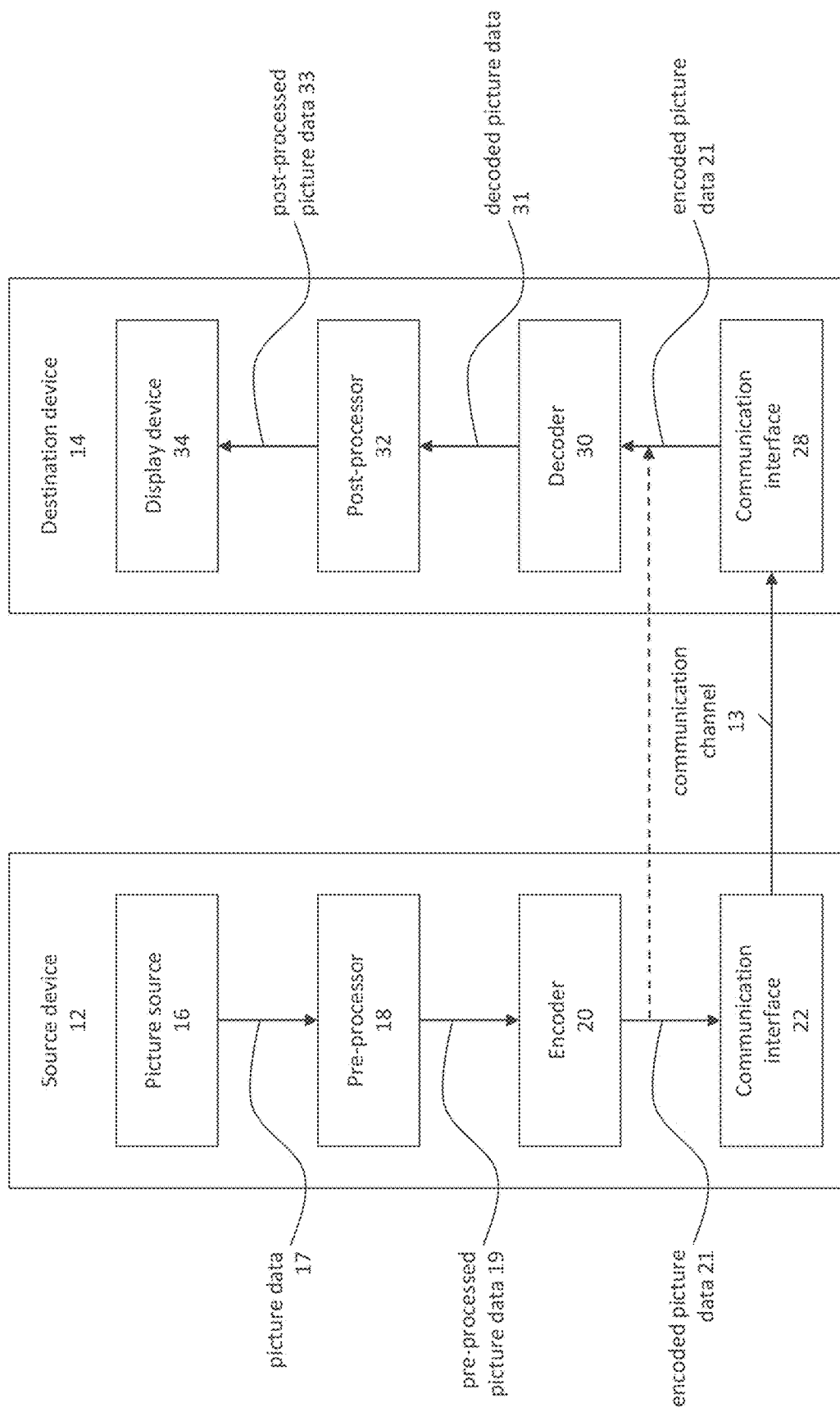
FIG. 20A is a block diagram showing an example of a video coding system configured to implement embodiments of the invention.
Figure 20B:
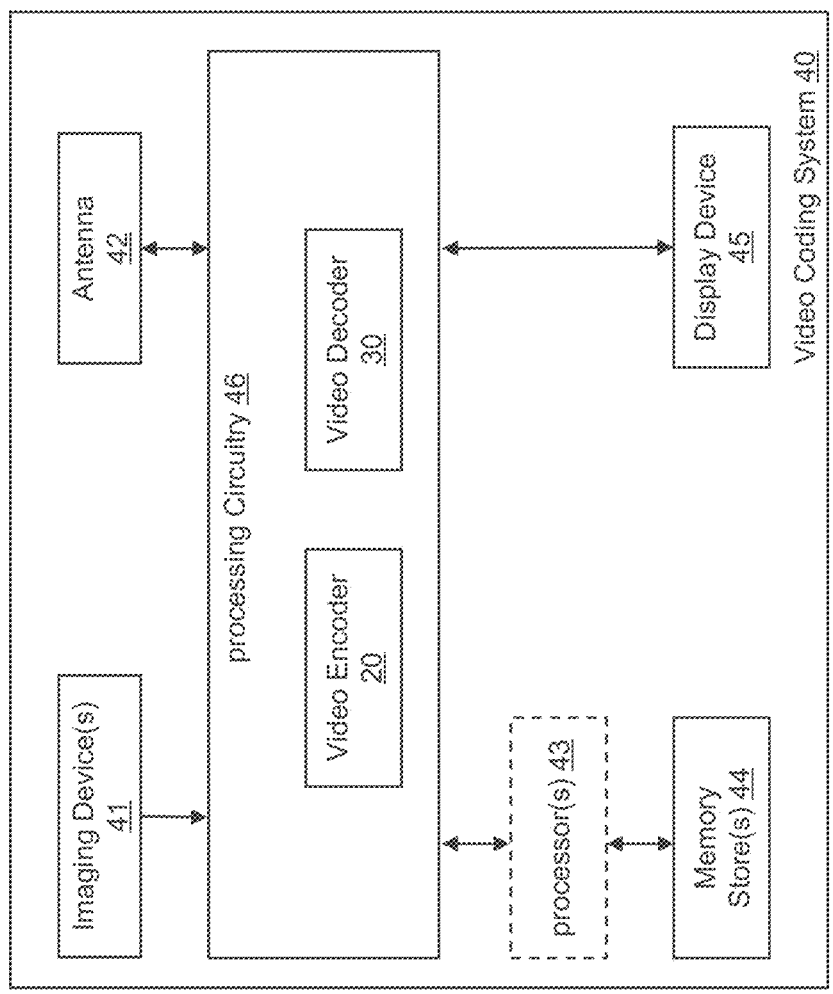
FIG. 20B is a block diagram showing another example of a video coding system configured to implement embodiments of the invention.
Figure 21:
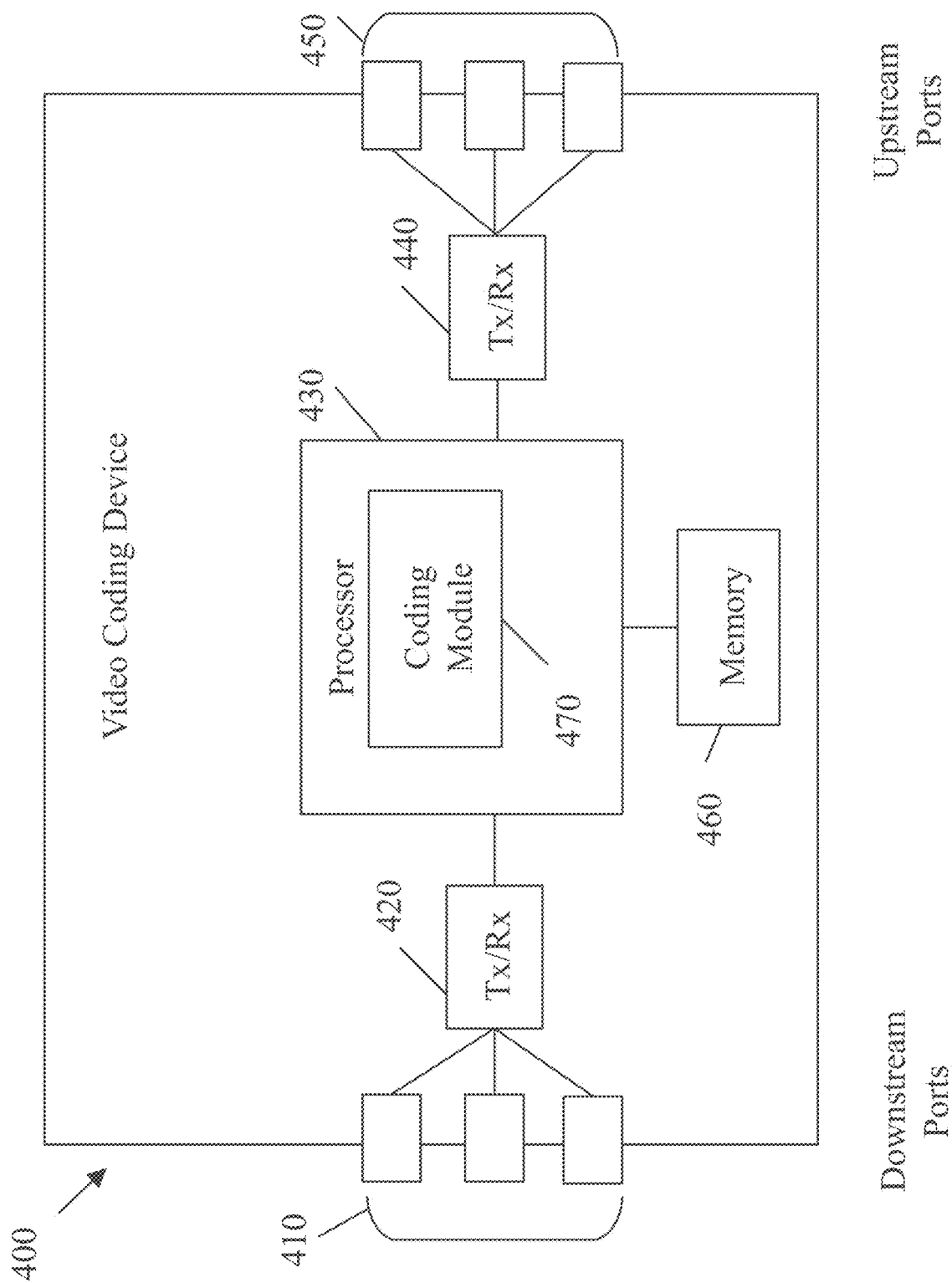
FIG. 21 is a block diagram illustrating an example of an encoding apparatus or a decoding apparatus.

FIGS. 20 to 22 show an example implementation of video coding systems and methods that may be used together with more specific embodiments of the invention described in the figures.

FIG. 20A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 20A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. Some embodiments of the present disclosure (e.g. relating to an initial rescaling or rescaling between two proceeding layers) may be implemented by the encoder 20. Some embodiments (e.g. relating to an initial rescaling) may be implemented by the picture pre-processor 18.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, colour format conversion (e.g. from RGB to YCbCr), colour correction, or de-noising. It can be understood that the pre-processing unit 18 may be optional component.

The video encoder 20 is configured to receive the pre-processed picture data 19 and provide encoded picture data 21. The encoder 20 may be implemented via processing circuitry 46 to embody the various modules.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 22). The decoder 30 may be implemented via processing circuitry 46 to embody the various modules.

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. colour format conversion (e.g. from YCbCr to RGB), colour correction, trimming, or re-sampling, or any other processing, e.g. for preparing the decoded picture data 31 for display, e.g. by display device 34.

Some embodiments of the disclosure may be implemented by the decoder 30 or by the post-processor 32.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 20A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 20A may vary depending on the actual device and application.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody various modules and/or any other encoder system or subsystem described herein. The decoder 30 may be implemented via processing circuitry 46 to embody various modules and/or any other decoder system or subsystem described herein. The processing circuitry may be configured to perform the various operations as discussed later. As shown in FIG. 22, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 20B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 20A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

FIG. 21 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 20A or an encoder such as video encoder 20 of FIG. 20A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 22 is a simplified block diagram of an apparatus 500 that may be used as either or both of the source device 12 and the destination device 14 from FIG. 20A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Summarizing, the present disclosure relates to scalable encoding and decoding of pictures. In particular, a picture is processed by one or more network layers of a trained module to obtain base layer features. Then, enhancement layer features are obtained, e.g. by a trained network processing in sample domain. The base layer features are for use in computer vision processing. The base layer features together with enhancement layer features are for use in picture reconstruction relevant, for example, for human vision. The base layer features and the enhancement layer features are coded in respective base layer bitstream and enhancement layer bitstream. Accordingly, a scalable coding is provided which supports computer vision processing and/or picture reconstruction.

LIST OF REFERENCE SIGNS

Figure 7:
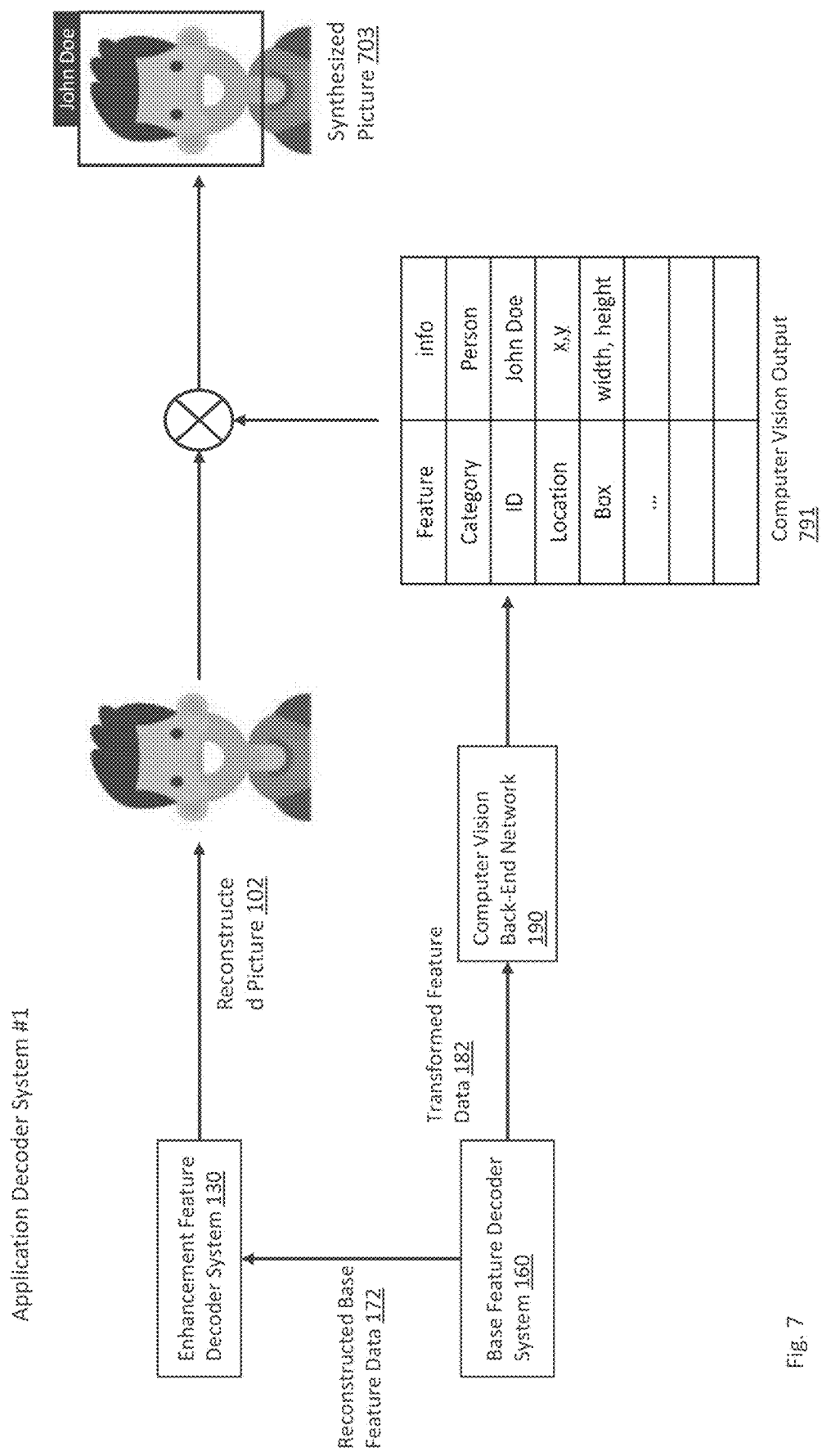
FIG. 7 is a block diagram of a computer vision processing system, including a scalable video and feature decoder based on one of the embodiments of the invention, performing the computer vision processing task of face recognition.
Figure 8:
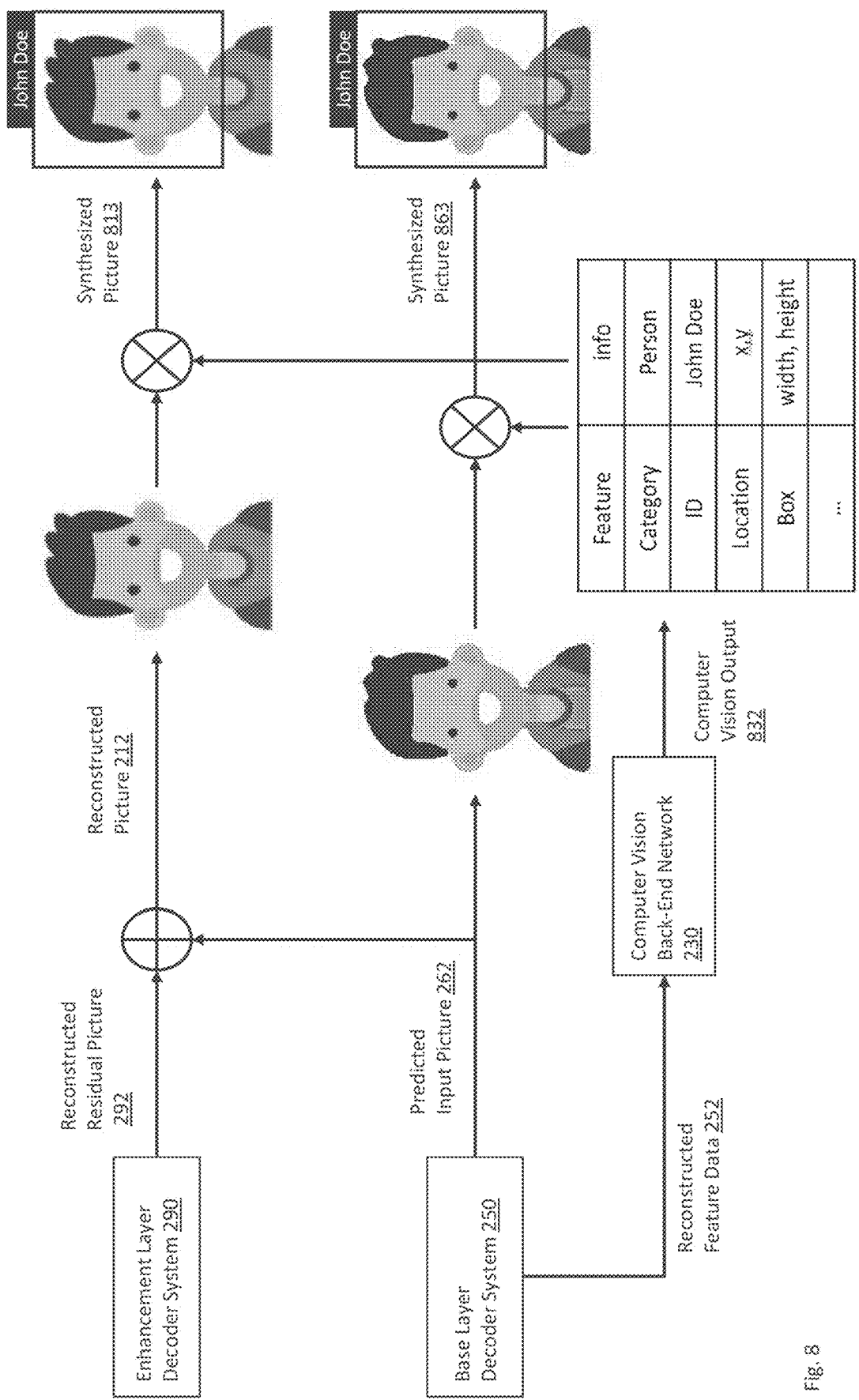
FIG. 8 is a block diagram of a computer vision system, including a scalable video and feature decoder based on one of the embodiments of the invention, performing the computer vision processing task of face recognition.

FIG. 1
 100 Encoder System
 102 Input Picture
 110 Encoder Neural Network
 112 Base Feature Data
 114 Enhancement Data
 120 Compression Subsystem
 122 Base Feature Bitstream
 124 Enhancement Feature Bitstream
 130 Enhancement Feature Decoder System
 140 Enhancement Feature Reconstruction Subsystem
 142 Reconstructed Enhancement Feature Data
 150 Decoder Neural Network
 152 Reconstructed Picture
 160 Base Feature Decoder System 160
 170 Base Feature Reconstruction Subsystem
 172 Reconstructed Base Feature Data
 180 Latent Space Transform Neural Network
 182 Transformed Feature Data
 190 Computer Vision Back-End Network
 192 Computer Vision Output
FIG. 2
 200 Encoder System
 202 Input Picture
 212 Reconstructed Picture
 220 Computer Vision Front-End Network
 222 Feature Data
 230 Computer Vision Back-End Network
 232 Computer Vision Output
 240 Base Layer Encoder System
 242 Base Layer Bitstream
 244 Residual Picture
 250 Base Layer Decoder System
 252 Reconstructed Feature Data
 260 Decoder System 260
 262 Predicted Input Picture
 280 Enhancement Layer Encoder System
 282 Enhancement Layer Bitstream
 290 Enhancement Layer Decoder System
 292 Reconstructed Residual Picture
FIG. 3
 320 Encoder Neural Network
 322 Encoder Feature Data
 330 Neural Network for Feature Reconstruction
 340 Compression Subsystem
 350 Decoding Subsystem
 352 Decoded Feature Data
 360 Neural Network for Input Prediction
FIG. 4
 400 Base Layer Data Container
 404 Coded Base Data Header
 406 Base Feature (Layer) Bitstream
 410 Enhancement Layer Data Container
 414 Coded Enhancement Data Header
 418 Enhancement Feature (Layer) Bitstream
FIG. 5
 500 CV Analyzer
 510 Enhancement Feature Bitstream Storage
 511 Access request
 520 Base Feature Storage
 530 Base Feature Retrieval
 540 Face Recognition
 550 Object Detection
FIG. 6
 600 CV Analyzer
 610 Enhancement Layer Bitstream Storage
 611 Access request
 630 Decoded Feature Data Storage
FIG. 7
 703 Synthesized Picture
 793 Computer Vision Output
FIG. 8
 813 Synthesized Picture
 832 Computer Vision Output
 863 Synthesized Picture

The invention claimed is:

1. An apparatus for processing a bitstream, the apparatus comprising:
a memory comprising instructions and a processing circuitry configured to execute the instructions to cause the apparatus to:
obtain a base layer bitstream including base layer features of a latent space and an enhancement layer bitstream including enhancement layer features;
extract from the base layer bitstream the base layer features; and
perform:
computer vision processing based on the base layer features; and
extracting the enhancement layer features from the enhancement layer bitstream and reconstructing a picture based on the base layer features and the enhancement layer features, and the reconstructing of the picture comprises:
combining the base layer features and the enhancement layer features; and
reconstructing the picture based on the combined features.

2. The apparatus according to claim 1, wherein the processing circuitry is further configured to execute the instructions to cause the apparatus to perform computer-vision processing based on the base layer features, and the computer-vision processing includes processing of the base layer features by one or more network layers of a first trained subnetwork.

3. The apparatus according to claim 2, wherein the reconstructing of the picture includes processing the combined features by one or more network layers of a second trained subnetwork different from the first trained subnetwork.

4. The apparatus according to claim 1, wherein the reconstructing of the picture includes:
reconstructing a base layer picture based on the base layer features; and adding the enhancement layer features to the base layer picture.

5. The apparatus according to claim 4, wherein the enhancement layer features are based on differences between an encoder-side input picture and the base layer picture.

6. The apparatus according to claim 1, wherein the processing circuitry is configured to execute the instructions to cause the apparatus to perform the extracting the enhancement layer features from the enhancement layer bitstream and reconstructing the picture based on the base layer features and the enhancement layer features, and the reconstructed picture is a frame of a video, and the base layer features and the enhancement layer features are for a plurality of frames of the video.

7. The apparatus according to claim 1, wherein the processing circuitry is further configured to execute the instructions to further cause the apparatus to de-multiplex the base layer features and the enhancement layer features from a bitstream per frame.

8. The apparatus according to claim 1, wherein the processing circuitry is further configured to execute the instructions to further cause the apparatus to decrypt a portion of a bitstream including the enhancement layer features.

9. An apparatus for processing a bitstream, the apparatus comprising:
  a memory comprising instructions and a processing circuitry configured to execute the instructions to cause the apparatus to:
  obtain a base layer bitstream including base layer features of a latent space and an enhancement layer bitstream including enhancement layer features;
  extract from the base layer bitstream the base layer features; and
  perform:
    computer-vision processing based on the base layer features, including processing of the base layer features by one or more network layers of a first trained subnetwork.

10. The apparatus according to claim 9, wherein the processing circuitry is further configured to execute the instructions to cause the apparatus to perform extracting the enhancement layer features from the enhancement layer bitstream and reconstructing a picture based on the base layer features and the enhancement layer features, and the reconstructing of the picture includes:
  combining the base layer features and the enhancement layer features; and
  reconstructing the picture based on the combined features.

11. The apparatus according to claim 10, wherein the processing circuitry is further configured to execute the instructions to cause the apparatus to perform extracting the enhancement layer features from the enhancement layer bitstream and reconstructing the picture based on the base layer features and the enhancement layer features, and the reconstructing of the picture includes processing the combined features by one or more network layers of a second trained subnetwork different from the first trained subnetwork.

12. The apparatus according to claim 9, wherein the processing circuitry is further configured to execute the instructions to cause the apparatus to perform extracting the enhancement layer features from the enhancement layer bitstream and reconstructing a picture based on the base layer features and the enhancement layer features, and the reconstructing of the picture includes:
  reconstructing a base layer picture based on the base layer features; and
  adding the enhancement layer features to the base layer picture.

13. The apparatus according to claim 12, wherein the enhancement layer features are based on differences between an encoder-side input picture and the base layer picture.

14. The apparatus according to claim 9, wherein the processing circuitry is configured to execute the instructions to further cause the apparatus to perform extracting the enhancement layer features from the enhancement layer bitstream and reconstructing a picture based on the base layer features and the enhancement layer features, and the reconstructed picture is a frame of a video, and the base layer features and the enhancement layer features are for a plurality of frames of the video.

15. The apparatus according to claim 9, wherein the processing circuitry is further configured to execute the instructions to further cause the apparatus to de-multiplex the base layer features and the enhancement layer features from a bitstream per frame.

16. The apparatus according to claim 9, wherein the processing circuitry is further configured to execute the instructions to further cause the apparatus to decrypt a portion of a bitstream including the enhancement layer features.

17. An apparatus for processing a bitstream, the apparatus comprising:
  a memory comprising instructions and a processing circuitry configured to execute the instructions to cause the apparatus to:
  obtain a base layer bitstream including base layer features of a latent space and an enhancement layer bitstream including enhancement layer features;
  extract from the base layer bitstream the base layer features; and
  perform:
    extracting the enhancement layer features from the enhancement layer bitstream and reconstructing a picture based on the base layer features and the enhancement layer features, and the reconstructing of the picture comprises:
      reconstructing a base layer picture based on the base layer features; and
      adding the enhancement layer features to the base layer picture.

18. The apparatus according to claim 17, wherein the enhancement layer features are based on differences between an encoder-side input picture and the base layer picture.

19. The apparatus according to claim 17, wherein the processing circuitry is configured to execute the instructions to cause the apparatus to perform the extracting the enhancement layer features from the enhancement layer bitstream and reconstructing the picture based on the base layer features and the enhancement layer features, and the reconstructed picture is a frame of a video, and the base layer features and the enhancement layer features are for a plurality of frames of the video.

20. The apparatus according to claim 17, wherein the processing circuitry is further configured to execute the instructions to further cause the apparatus to de-multiplex the base layer features and the enhancement layer features from a bitstream per frame.

21. The apparatus according to claim 17, wherein the processing circuitry is further configured to execute the instructions to further cause the apparatus to decrypt a portion of a bitstream including the enhancement layer features.

* * * * *